US012734440B2

(12) United States Patent
Shi

(10) Patent No.: US 12,734,440 B2
(45) Date of Patent: Sep. 15, 2026

(54) VIRTUAL OBJECT DYNAMIC CHANGE METHOD, APPARATUS, AND DEVICE, AND STORAGE MEDIUM

(71) Applicant: Tencent Technology (Shenzhen) Company Limited, Shenzhen (CN)

(72) Inventor: Zhenyu Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 623 days.

(21) Appl. No.: 17/965,658

(22) Filed: Oct. 13, 2022

(65) Prior Publication Data

US 2023/0041183 A1 Feb. 9, 2023

Related U.S. Application Data

(63) Continuation of application No. PCT/CN2021/107131, filed on Jul. 19, 2021.

(30) Foreign Application Priority Data

Sep. 2, 2020 (CN) ......................... 202010908174.3

(51) Int. Cl.
*A63F 13/52* (2014.01)
*A63F 13/533* (2014.01)
(Continued)

(52) U.S. Cl.
CPC ............ *A63F 13/52* (2014.09); *A63F 13/533* (2014.09); *A63F 13/56* (2014.09); *A63F 13/58* (2014.09);
(Continued)

(58) Field of Classification Search
CPC ........ A63F 13/52; A63F 13/533; A63F 13/65; A63F 2300/308; A63F 2300/69; A63F 13/56; A63F 13/58; A63F 13/67
See application file for complete search history.

(56) References Cited

U.S. PATENT DOCUMENTS 7,468,729 B1 * 12/2008 Levinson .............. A63F 13/795 709/204
9,652,809 B1 * 5/2017 Levinson ............... G06Q 50/01
(Continued)

FOREIGN PATENT DOCUMENTS

CN 101668571 A 3/2010
CN 106621335 A 5/2017
(Continued)

OTHER PUBLICATIONS

Metal Gear Solid V: The Phantom Pain. Wikipedia.org. Online. 2019-08-20. Accessed via the Internet. Accessed Feb. 14, 2025. < URL: https://en.wikipedia.org/w/index.php?title=Metal_Gear_Solid_V:_The_Phantom_Pain&oldid=911723656> (Year: 2019).*
(Continued)

*Primary Examiner* — Carl V Larsen
(74) *Attorney, Agent, or Firm* — Morgan, Lewis & Bockius LLP

(57) ABSTRACT

This application provides a virtual object dynamic change method performed by a computer device. The method includes: obtaining a target region displayed by a virtual scene on a current interface; determining an environmental element associated with the target region, and an operation to a virtual object displayed in the target region; determining a dynamic change parameter of the virtual object according to the environmental element and the operation; updating the virtual object in the target region according to the dynamic change parameter, to obtain a updated virtual object; and
(Continued)

causing a display of the updated virtual object on the current interface.

11 Claims, 13 Drawing Sheets

(51) Int. Cl.
*A63F 13/56* (2014.01)
*A63F 13/58* (2014.01)
*A63F 13/65* (2014.01)

(52) U.S. Cl.
CPC ........ *A63F 13/65* (2014.09); *A63F 2300/308* (2013.01); *A63F 2300/69* (2013.01)

(56) References Cited

U.S. PATENT DOCUMENTS

| | | | | |
|---|---|---|---|---|
| 2009/0307671 | A1* | 12/2009 | White | A63F 13/45 717/149 |
| 2010/0292008 | A1* | 11/2010 | Matsumura | A63F 13/45 463/43 |
| 2012/0129595 | A1* | 5/2012 | Kim | H04N 7/181 463/29 |
| 2014/0279800 | A1* | 9/2014 | Anastasopoulos | G06N 5/025 706/47 |
| 2014/0354694 | A1* | 12/2014 | Loduha | A63F 13/573 345/648 |
| 2015/0112791 | A1* | 4/2015 | Jain | G06Q 30/0255 455/405 |
| 2015/0126286 | A1* | 5/2015 | Guo | A63F 13/67 463/42 |
| 2016/0314609 | A1* | 10/2016 | Taylor | A63F 13/65 |
| 2018/0350127 | A1* | 12/2018 | Davidson | H04L 51/04 |
| 2020/0197811 | A1 | 6/2020 | Eatedali et al. | |
| 2020/0273230 | A1* | 8/2020 | Amitay | H04M 1/72457 |
| 2022/0387887 | A1* | 12/2022 | Kipnis | G06N 5/025 |

FOREIGN PATENT DOCUMENTS

| | | | |
|---|---|---|---|
| CN | 107890675 | A | 4/2018 |
| CN | 109011578 | A | 12/2020 |
| CN | 112044063 | A | 12/2020 |

OTHER PUBLICATIONS

Time and weather changes | Exploring the game's world. Gamepressure.com. Online. May 11, 2016. Accessed via the Internet. Accessed Feb. 14, 2025. <URL: https://www.gamepressure.com/mgs5thephantompain/time-and-weather-changes/zb7b11> (Year: 2016).*

Evidently weather modification works on the Skulls . . . Reddit.com. Online. 2017. Accessed via the Internet. Accessed Feb. 14, 2025. <URL: https://www.reddit.com/r/metalgearsolid/comments/5sxh28/evidently_weather_modification_works_on_the_skulls/> (Year: 2017).*

World of Warcraft. Wikipedia.org. Online. Aug. 30, 2019. Accessed via the Internet. Accessed Feb. 14, 2025. <URL: https://en.wikipedia.org/w/index.php?title=World_of_Warcraft&oldid=913146327> (Year: 2019).*

Spawn. Vanilla-wow-archive.fandom.com. Online. Oct. 15, 2012. Accessed via the Internet. Accessed Feb. 14, 2025. <URL: https://vanilla-wow-archive.fandom.com/wiki/Spawn?oldid=19040> (Year: 2012).*

Add. Wowwiki-archive.fandom.com. Online. Jun. 20, 2018. Accessed via the Internet. Accessed Feb. 14, 2025. <URL: https://wowwiki-archive.fandom.com/wiki/Add?oldid=2846034> (Year: 2018).*

Tencent Technology, WO, PCT/CN2021/107131, Oct. 20, 2021, 5 pgs.

Tencent Technology, IPRP, PCT/CN2021/107131, Mar. 7, 2023, 6 pgs.

Tencent Technology, ISR, PCT/CN2021/107131, Oct. 20, 2021, 3 pgs.

Ten-Mile Gallery, "Enjoy the Cherry Blossoms on Sunny Days, and Take Shelter from the Rain on Rainy and Snowy Days. Let's Talk About the Weather Changes in Dragon Fantasy", Sohu Company, Jul. 13, 2019, 7 pgs., Retrieved from the Internet: https://m.sohu.com/a/326640583_120099908 , Jul. 13, 2019.

* cited by examiner

VIRTUAL OBJECT DYNAMIC CHANGE METHOD, APPARATUS, AND DEVICE, AND STORAGE MEDIUM

CROSS-REFERENCE TO RELATED APPLICATIONS

This application is a continuation application of PCT Patent Application No. PCT/CN2021/107131, entitled "METHOD, APPARATUS, AND DEVICE FOR DYNAMIC CHANGE OF VIRTUAL OBJECT, AND STORAGE MEDIUM" filed on Jul. 19, 2021, which claims priority to Chinese Patent Application No. 202010908174.3, filed with the State Intellectual Property Office of the People's Republic of China on Sep. 2, 2020, and entitled "GAME OBJECT DYNAMIC CHANGE METHOD, DEVICE AND EQUIPMENT AND STORAGE MEDIUM", all of which are incorporated herein by reference in their entirety.

FIELD OF THE TECHNOLOGY

This application relates to the field of Internet technologies, and relates to, but is not limited to, a virtual object dynamic change method, apparatus, and device, and a storage medium.

BACKGROUND OF THE DISCLOSURE

A human-computer interaction technology of a virtual scene based on graphics processing hardware can implement diversified interaction between a virtual object controlled by a user or artificial intelligence according to actual application requirements, and has wide practical value. For example, in virtual scenes such game, a real battle process between virtual objects can be simulated.

Using the game as an example, in the current large map game, such as a massive multiplayer online role-playing game (MMORPG), virtual objects in a game scene present a relatively static display. An object behavior is solidified according to a set of patterns, which is lack of vividness, has no connection with changes of the game scene. The effect that the whole game scene presents to the user is monotonous.

SUMMARY

Embodiments of this application provide a virtual object dynamic change method, apparatus, and device, and a storage medium, which can make a game scene present diverse dynamic changes, so that the display of the whole game scene is closer to the real world.

Technical solutions in the embodiments of this application are implemented as follows:

An embodiment of this application provides a virtual object dynamic change method performed by a computer device. The method includes:

obtaining a target region displayed by a virtual scene on a current interface;

determining an environmental element associated with the target region, and an operation to a virtual object displayed in the target region;

determining a dynamic change parameter of the virtual object according to the environmental element and the operation;

updating the virtual object in the target region according to the dynamic change parameter, to obtain a updated virtual object; and causing a display of the updated virtual object on the current interface.

An embodiment of this application provides a virtual object dynamic change apparatus. The apparatus includes:

an obtaining module, configured to obtain a target region displayed by a virtual scene on a current interface;

a first determining module, configured to determine an environmental element associated with the target region, and an operation to a virtual object displayed in the target region;

a second determining module, configured to determine a dynamic change parameter of the virtual object according to the environmental element and the operation;

a refresh module, configured to refresh the virtual object in the target region according to the dynamic change parameter, to obtain a updated virtual object; and a display module, configured to cause a display of the updated virtual object on the current interface.

An embodiment of this application provides a virtual object dynamic change device. The device includes:

a memory, configured to store executable instructions; and a processor, configured to implement the virtual object dynamic change method when executing the executable instructions stored in the memory.

An embodiment of this application provides a non-transitory computer-readable storage medium, storing executable instructions, the executable instructions, when executed by a processor, causing the processor to implement the virtual object dynamic change method.

The embodiments of this application have the following beneficial effects: The environmental element associated with the target region displayed by the virtual scene on the current interface, and the interaction to the virtual object displayed in the target region are determined. The dynamic change parameter of the virtual object is determined according to the environmental element and the interaction. That is, the dynamic change parameter of the virtual object is determined by a current environmental element of the virtual scene and a player's interaction with the displayed virtual object. Then the virtual object in the target region is refreshed now and then according to the determined dynamic change parameter, so that the game scene presents diverse dynamic changes. In addition, the operation may also have an impact on the virtual scene, so that the whole virtual scene continuously presents a dynamic change state with an environmental factor and an operation of the player, which can ensure that the virtual scene is more authentic and provide the player with an immersive experience.

DESCRIPTION OF EMBODIMENTS

Figure 1:
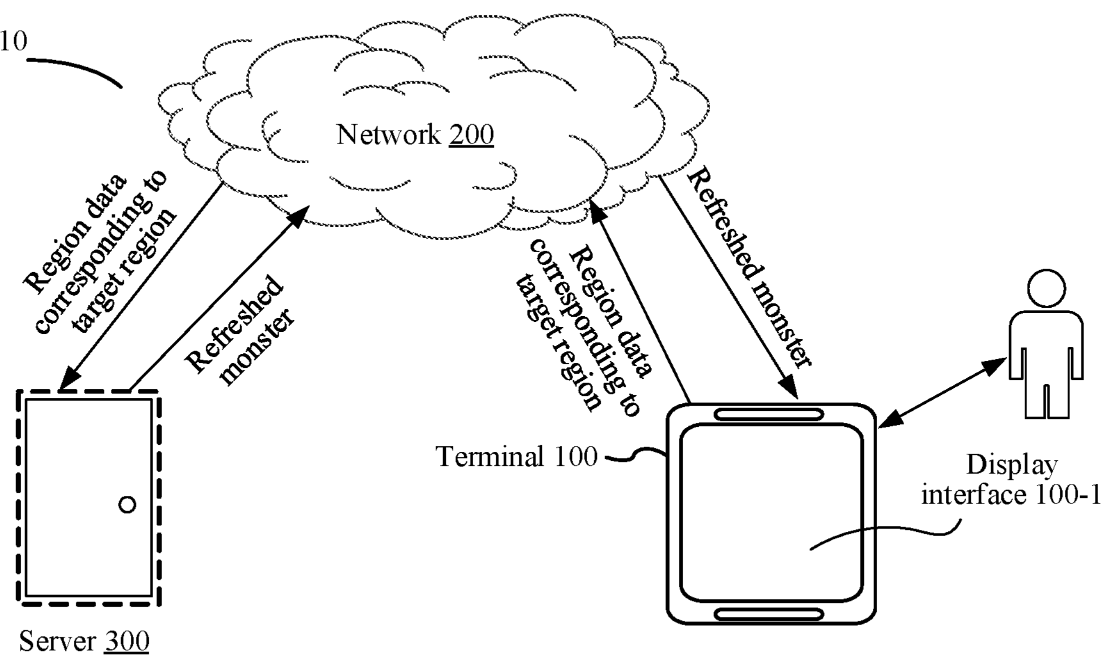
FIG. 1 is a schematic diagram of a network architecture of a virtual object dynamic change system according to an embodiment of this application.
Figure 2:
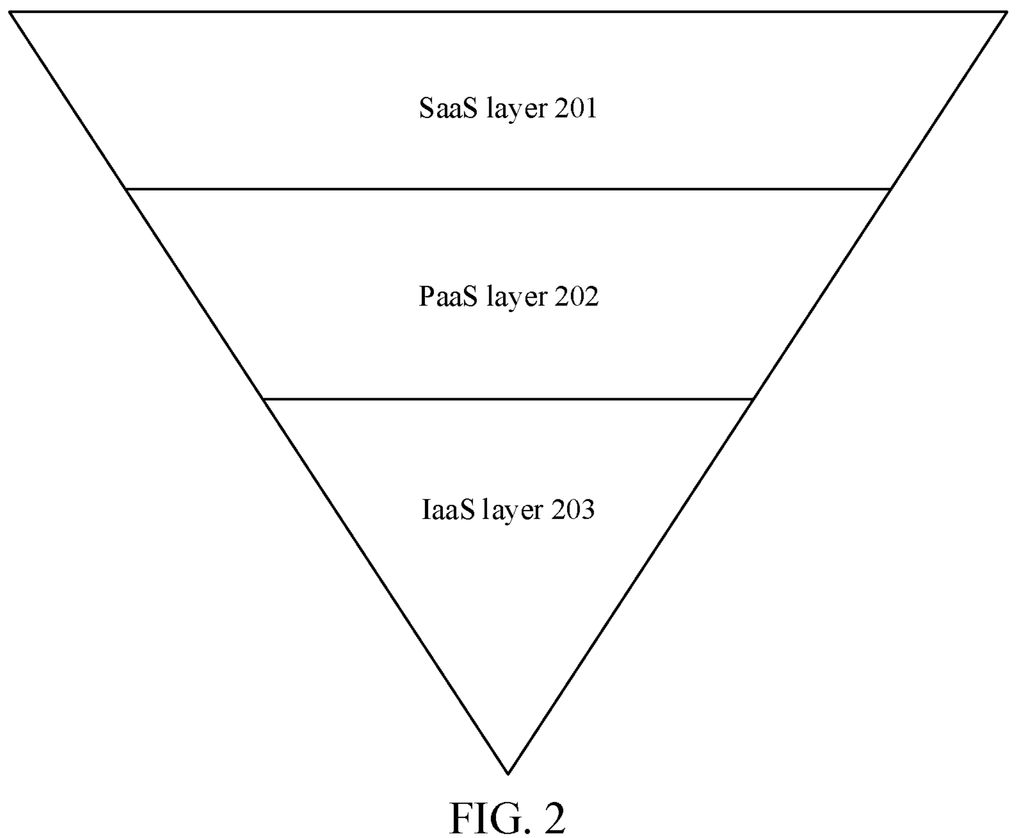
FIG. 2 is a schematic diagram of a deployment relationship among an IaaS layer, a PaaS layer, and a SaaS layer according to an embodiment of this application.

To make objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict. Unless otherwise defined, meanings of all technical and scientific terms used in the embodiments of this application are the same as those usually understood by a person skilled in the art to which the embodiments of this application belong. Terms used in the embodiments of this application are merely intended to describe objectives of the embodiments of this application, but are not intended to limit this application.

Before the embodiments of this application are explained, technical terms involved in this application are first explained:

1) Time: It may refer to real time elapsing in real world or refer to virtual time, which is game time determined according to a change of time in a game, for example, morning in a game scene, noon in the game scene, and evening in the game scene. The game time is often set to be faster than real time.

2) Weather: It may refer to realist weather happening in real world or refer to unrealistic weather, which is a weather element determined according to a scene in the game, that is, a weather condition of a corresponding scene in the game scene.

3) Non-Playable Character (NPC) AI: It refers to artificial intelligence (AI) endowed to a NPC, which provides the NPC with a certain capability of dealing with a current situation. Although the term "AI" is conventionally used, it does not mean that the NPC's algorithm needs to meet certain level of intelligence. Any algorithm that can instruct a NPC to behave can be an NPC AI. An example of such NPC is a monster. For example, when a player attacks a monster, the monster may aware and fights back against the player (this is to be the most basic monster AI), and a monster with slightly advanced monster AI may summon nearby monsters to attack the player together or find a nearby bunker to hide.

4) Alert range: It refers to a specific range around an NPC in the game within which the NPC can react to changes. For example, if the player enters the range, a monster AI switches from a non-battle state to a battle state.

5) Grouping: A plurality of NPC (such as monsters) form a group in the game. The group of NPCs may share certain common trait or behavior pattern. For example, in one of such group, when one of the monsters enters the battle state, and the other monsters in the same group all enter the battle state.

6) Killing speed: It refers to how fast a group of monsters are being eliminated. For example, the speed can be calculated based on the quantity of monsters belonging to a monster cluster that are killed by the player per unit time for the monster cluster in the entire server.

In order to resolve at least one problem existing in a virtual object dynamic change method in the related art, the embodiments of this application provide a virtual object dynamic change method. According to an embodiment of the method, by using more changing dimensions, such as environment of the game scene and a player's interaction behavior with NPCs as impact factors, NPCs on a large map are dynamically controlled and refreshed, such as changing NPC AI, refreshing a NPC type and group quantity, changing NPC distribution and appearance of a scene building, which makes the game scene present a dynamic change and is more vivid. In the embodiments of this application, the NPC cluster in a virtual scene is dynamically changed according to a specific algorithm. With a plurality of NPC clusters combined with a plurality of maps being dynamically changed according to the algorithm, the entire game scene presents a dynamic changing feeling.

The following is an exemplary application of a virtual object dynamic change device in the embodiments of this application. In an implementation, the virtual object dynamic change device provided in the embodiments of this application may be implemented as any terminal on which a game application can run, such as a notebook computer, a tablet computer, a desktop computer, a mobile device (for example, a mobile phone, a portable music player, a personal digital assistant, a dedicated messaging device, or a potable game device), or a game console. In another implementation, the virtual object dynamic change device provided in the embodiments of this application may also be a server, such as in cloud gaming scenario. An exemplary application when the virtual object dynamic change device is implemented as a server is described below.

FIG. 1 is a schematic diagram of a network architecture of a virtual object dynamic change system 10 according to an embodiment of this application. In order to dynamically refresh a virtual object in a game application, the virtual object dynamic change system 10 provided in the embodiments of this application includes a terminal 100, a network 200, and a server 300. The game application runs on the terminal 100 or the server 300. A target region in a virtual scene is displayed on a current interface 100-1 of the terminal 100, and the target region includes at least one virtual object, where the virtual object may be a monster in a game.

While a player runs the game application through the terminal 100, the player operates a character in the game to complete a game process. In a process that the player plays the game, the terminal sends a user operation of the player on the terminal and region data corresponding to a currently displayed target region corresponding based on the user operation to the server 300 through the network 200, so as to achieve data synchronization between the terminal 100 and the server 300. After obtaining the target region displayed by the virtual scene on the current interface, the server 300 determines an environmental element associated with the target region, a virtual object in the target region and an interaction with the virtual object displayed in the target region; determines a dynamic change parameter of a NPC according to the environmental element and the interaction; updates the NPC in the target region according to the dynamic change parameter, to obtain a updated monster. In some embodiment, the server further sends information about the updated monster to the terminal 100, and the terminal determines behavior of the updated monster. In some embodiment, the server determines behavior of the updated monster and send the behavior to the terminal for display.

The virtual object dynamic change method provided in the embodiments of this application may relate to the field of cloud technology, and may be implemented based on a cloud platform and through the cloud technology. For example, the server 300 may be a cloud server. The cloud server corresponds to a cloud memory. The virtual scene may be stored in the cloud memory, that is, the virtual scene and game data under the virtual scene may be stored by using cloud storage technology.

The virtual object dynamic change method provided in the embodiments of this application may also relate to the field of artificial intelligence technology, and may be implemented by technologies such as machine learning and image recognition processing in the artificial intelligence technology. In the embodiments of this application, image recognition and analysis are performed on the target region in the virtual scene by using the image recognition processing technology, to determine the environmental element associated with the target region, thereby determining the dynamic change parameter according to the environmental element. Similarly, a dynamic change parameter corresponding to each environmental element can be obtained by learning through the machine learning technology, so as to dynamically adjust a parameter of the virtual object in the target region. Therefore, the virtual object in the virtual scene can be dynamically refreshed, so that the entire game presents a dynamic change, which is closer to a corresponding situation in a real scene, and the game scene is more vivid, and provides the player with an immersive game experience.

Figure 3:
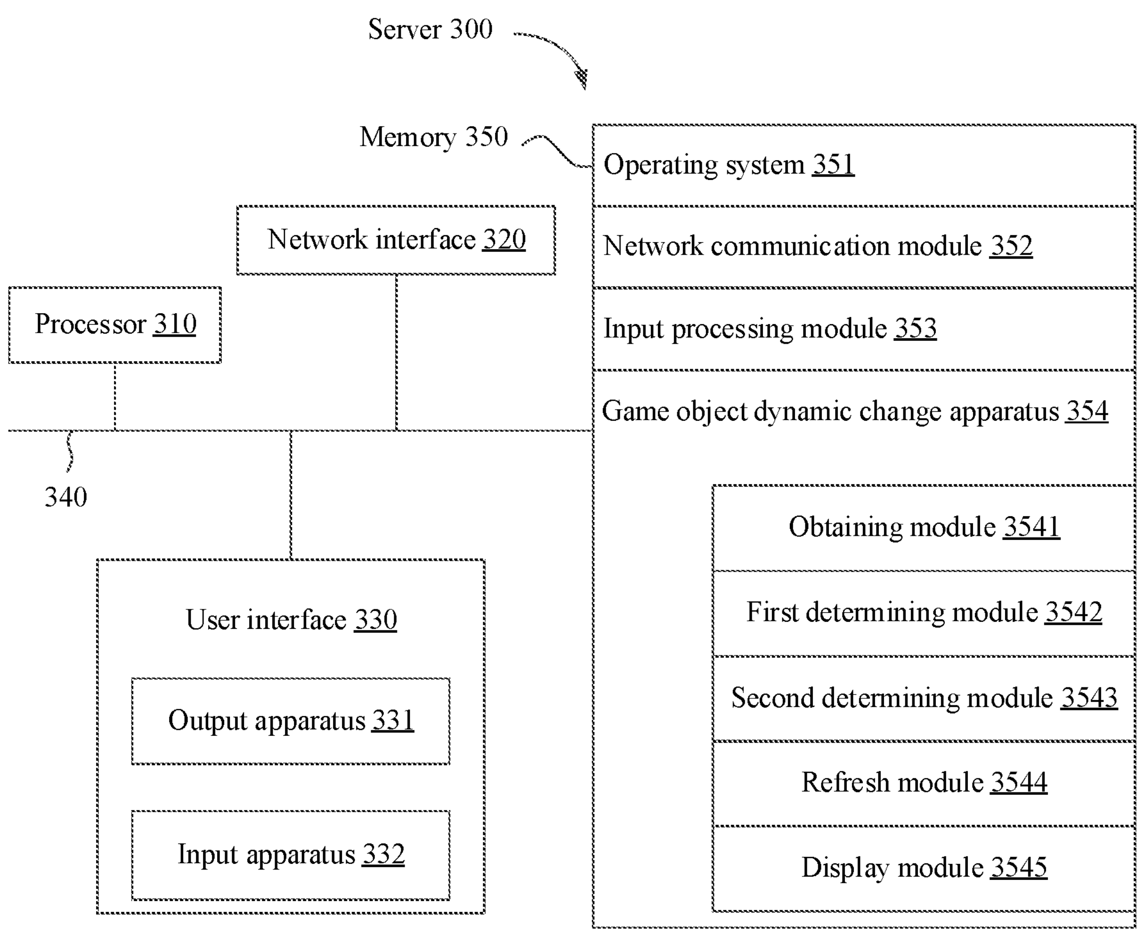
FIG. 3 is a schematic structural diagram of a server according to an embodiment of this application.

FIG. 3 is a schematic structural diagram of the server 300 according to an embodiment of this application. The server 300 in FIG. 3 may include: one processor 310, a memory 350, and one network interface 320. Components in the server 300 are coupled together by using a bus system 340 or similar means. It may be understood that the bus system 340 is configured to implement connection and communication between the components. In addition to a data bus, the bus system 340 may further include a power bus, a control bus, and a status signal bus. However, for ease of clear description, all types of buses are labeled as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 350 may be a removable memory, a non-removable memory, or a combination thereof. Exemplary hardware devices include a solid-state memory, a hard disk drive, an optical disc drive, or the like. The memory 350 may include one or more storage devices located physically away from the processor 310. The memory 350 includes a volatile memory or a non-volatile memory, or may include a volatile memory and a non-volatile memory. The non-volatile memory may be a read-only memory (ROM), and the volatile memory may be a random access memory (RAM). The memory 350 described in the embodiments of this application is to include any other suitable type of memories. In some embodiments, the memory 350 can store data to support various operations, examples of which include programs, modules, and data structures, or subsets or supersets thereof, as illustrated below.

An operating system 351 includes a system program configured to process various basic system services and perform a hardware-related task, for example, a framework layer, a core library layer, and a driver layer, and is configured to implement various basic services and process a hardware-related task.

A network communication module 352 is configured to reach another computing device through one or more (wired or wireless) network interfaces 320. Exemplary network interfaces 320 include: Bluetooth, wireless compatible authentication (WiFi), universal serial bus (USB), and the like.

An input processing module 353 is configured to detect one or more user inputs or interactions from one of the one or more input apparatuses 332 and translate the detected input or interaction.

In some embodiments, the apparatus provided in the embodiments of this application may be implemented by using software. FIG. 3 shows a virtual object dynamic change apparatus 354 stored in the memory 350. The virtual object dynamic change apparatus 354 may be a virtual object dynamic change apparatus in the server 300, which may be software in the form of programs and plug-ins, including the following software modules: an obtaining module 3541, a first determining module 3542, a second determining module 3543, a refresh module 3544, and a display module 3545. These modules are logical, and therefore can be combined or further split arbitrarily according to the functions implemented. The functions of the modules are described below.

In some other embodiments, the apparatus provided in the embodiments of this application may be implemented by using hardware. For example, the apparatus provided in the embodiments of this application may be a processor in the form of a hardware decoding processor, programmed to perform the virtual object dynamic change method provided in the embodiments of this application. For example, the processor in the form of a hardware decoding processor may adopt one or more application-specific integrated circuits (ASICs), a DSP, a programmable logic device (PLD), a complex programmable logic device (CPLD), a field-programmable gate array (FPGA), or other electronic components.

Figure 4:
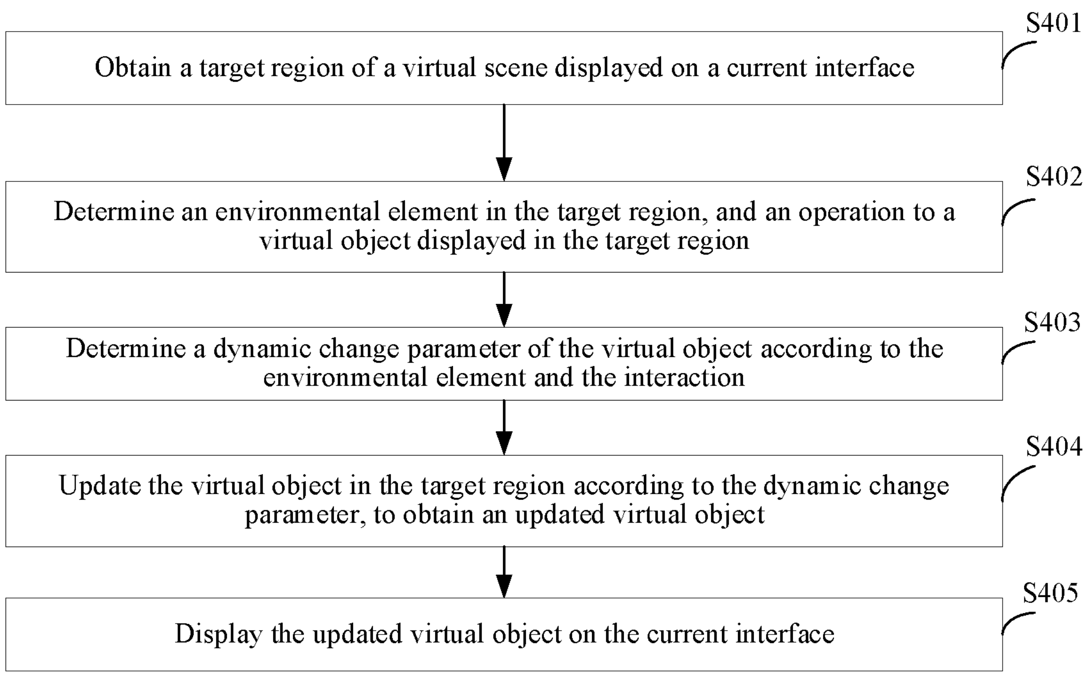
FIG. 4 is a schematic flowchart of an implementation of a virtual object dynamic change method according to an embodiment of this application.

The virtual object dynamic change method provided in the embodiments of this application is described below with reference to an exemplary application and implementation of the server 300 provided in the embodiments of this application. FIG. 4 is a schematic flowchart of an implementation of a virtual object dynamic change method according to an embodiment of this application. The method is described in combination with steps shown in FIG. 4.

Step S401. Obtain a target region of a virtual scene displayed on a current interface.

There may be various scenes and game facilities in the virtual scene. There may be a plurality of players at the same time in the same virtual scene. Each player has a respective angle of view of the game, such first-person perspective and third-person perspective. In the respective angle of view of the game, the player can see a partial or an overall region of the virtual scene where the player is currently located. Obtain the target region displayed by the virtual scene on the current interface. For any player, the target region may not be the overall region of the virtual scene, that is, the target region may be the partial region of the virtual scene or the overall region of the virtual scene. While a scene and a game facility in the target region change, a scene and a game facility in other regions that are not displayed may also change.

Step S402. Determine an environmental element associated with the target region, and an interaction with a virtual object associated with the target region.

The environmental element may include, but is not limited to, time, weather, defense facility, and prop. There may be a plurality of environmental elements at the same time, or may be only one environmental element associated the target region. In some embodiment, environmental element associated with a target region can be environment element located in the target region.

Interaction with a virtual object can be player controlling a character to have a conversation with the virtual object, attack the virtual object, or other operations of interacting with the virtual object. In the case of attaching the virtual object, interaction may include, but is not limited to, a speed of killing the virtual object displayed in the target region by the player. In some embodiments, killing speed is a quantity of virtual objects killed by the player that are displayed in the target region per unit time. Alternatively, the killing speed can be measured by (i) a total quantity of virtual objects killed by all players in the scene in a period, or (ii) a quantity of virtual objects within a virtual object group being killed in a period, or (iii) how quickly one virtual object is being killed. In this embodiment of this application, the virtual object displayed in the target region may be a monster to be killed.

During implementation of step S402, the environmental element associated with the target region may be determined based on game data corresponding to the target region, and the interaction with the virtual object associated with the target region may be determined based on operation data of the player.

Step S403. Determine a dynamic change parameter of the virtual object according to the environmental element and the interaction.

The dynamic change parameter refers to a parameter of the virtual object that can be adjusted regularly. It may be updated once per interval, such as 5 seconds, 1 minutes, a day, or in real time. It can also be updated each time the player leaves and enters again the associated region. It can also be updated each time a virtual object is killed and respawned. The dynamic change parameter may include, but is not limited to, parameters such as a quantity, group, type, attribute, facility, and distribution region. A quantity of virtual object may indicate the quantity of virtual objects in a territory, or in a group. Accordingly, the number of virtual objects can be determined. A group can mean a cluster of virtual objects and grouping mechanism can be determined. Type of virtual object can mean different breed of virtual object, such as dragon vs human, but can also mean a level of the virtual object, such as a normal level monster vs an elite level monster. Attribute can mean parameter associated with a virtual object, such as moving speed, attacking speed, patrolling pattern, health level, etc. Facility can mean buildings, movable or not, in the game. For example, the facility can be a fort, a castle, a deck, or even a battery. Virtual object may be able to enter the facilities and may be able to operate them. Facility in the game scene can be determined according to the embodiments of this application. Distribution region of the virtual object may mean how it is located in the game scene. For example, a plurality of virtual object may be distributed evenly or concentrated in a region.

In some embodiments of this application, because the environmental element and the interaction change in real time, the determined dynamic change parameter also changes in real time with the environmental element and the interaction.

In some embodiments, the dynamic change parameter of the virtual object may be periodically determined, and the dynamic change parameter of the virtual object may also be continuously determined.

Step S404. Update the virtual object in the target region according to the dynamic change parameter, to obtain a updated virtual object.

After the dynamic change parameter is determined, the virtual object in the target region is refreshed according to the dynamic change parameter. For example, if the dynamic change parameter specifies that a parameter is to increase amount of monsters from N to M, the M monsters form a new monster cluster, and there is an elite monster in the monster cluster, when the virtual objects in the target region is refreshed, a monster cluster formed by M monsters appears, and there is an elite monster in the monster cluster.

Step S405. Display the updated virtual object on the current interface.

According to the virtual object dynamic change method provided in the embodiments of this application, the environmental element associated with the target region displayed by the virtual scene on the current interface, and the interaction with the virtual object displayed in the target region are determined. The dynamic change parameter of the virtual object is determined according to the environmental element and the interaction. That is, the dynamic change parameter of the virtual object is determined by a current environmental element of the virtual scene and an operation of a player interacting with the displayed virtual object. Therefore, consistency between the dynamic change parameter and the scene can be regularly checked and ensured. Then the virtual object in the target region is refreshed according to the determined dynamic change parameter, so that the game scene presents diverse dynamic changes. In addition, the user operation also has an impact on the virtual scene, so that the whole virtual scene continuously presents a dynamic change state with an environmental factor and an operation of the player, which can ensure that the virtual scene is more authentic, and provide the player with an immersive experience, thereby boosting the appeal to the player.

Figure 5:
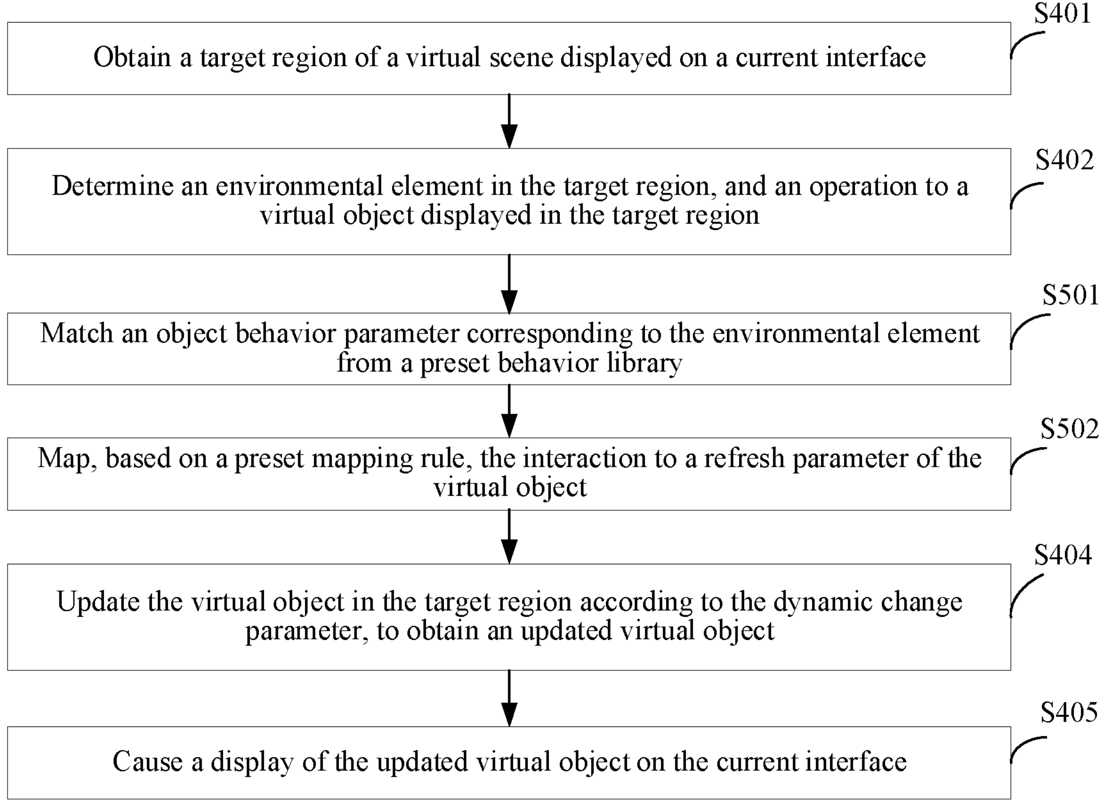
FIG. 5 is a schematic flowchart of another implementation of a virtual object dynamic change method according to an embodiment of this application.

In some embodiments, the dynamic change parameter may include an object behavior parameter and/or a refresh parameter of the virtual object. Based on FIG. 4, FIG. 5 is a schematic flowchart of another implementation of a virtual object dynamic change method according to an embodiment of this application. As shown in FIG. 5, step S403 may be implemented by the following steps:

Step S501. Match an object behavior parameter corresponding to the environmental element from a preset behavior library.

The object behavior parameter corresponds to a virtual object's behavior (that is, action) and a motion parameter. The preset behavior library stores at least one monster behavior and a motion parameter corresponding to the behavior. For example, a monster behavior may be any type of behavior similar to a human behavior that the monster can perform, such as taking shelter from rain, sleeping, killing, escaping, warming by fire, and patrolling.

The object behavior parameter may further include a motion parameter corresponding to the monster behavior, such as: moving speed, moving distance, patrolling route, climbing height, and the like.

In some embodiments of this application, different environmental elements can correspond to different behavior parameters, and different behavior parameters can correspond to different type of object behavior. That is, in some embodiments, a preset behavior library may store a mapping relationship between the environmental element and one type of behavior parameter. After the environmental element is determined, the object behavior parameter corresponding to the environmental element are matched from the preset behavior library according to the mapping relationship and adjusted. The virtual object's behavior will further be determined based on the adjusted behavior parameter.

Step S502. Map, based on a preset mapping rule, the interaction to a refresh parameter of the virtual object.

In some embodiments, how user interact with a virtual object or a group of virtual objects may affect how virtual object will be refreshed. Using killing as an example, there is a preset mapping relationship between the killing speed and a refresh parameter of the monster. After the killing speed is determined, mapping is performed according to the preset mapping rule and based on the preset mapping relationship, to obtain the refresh parameter of the monster. The refresh parameter may include virtual object type, group quantity, attribute, corresponding defense facility, and distribution region. For example, if a group of monsters is killed very quickly, a respawned group of monsters may include more and stronger monsters, with advanced defense facility in place, and distributed more concentrated.

Figure 6:
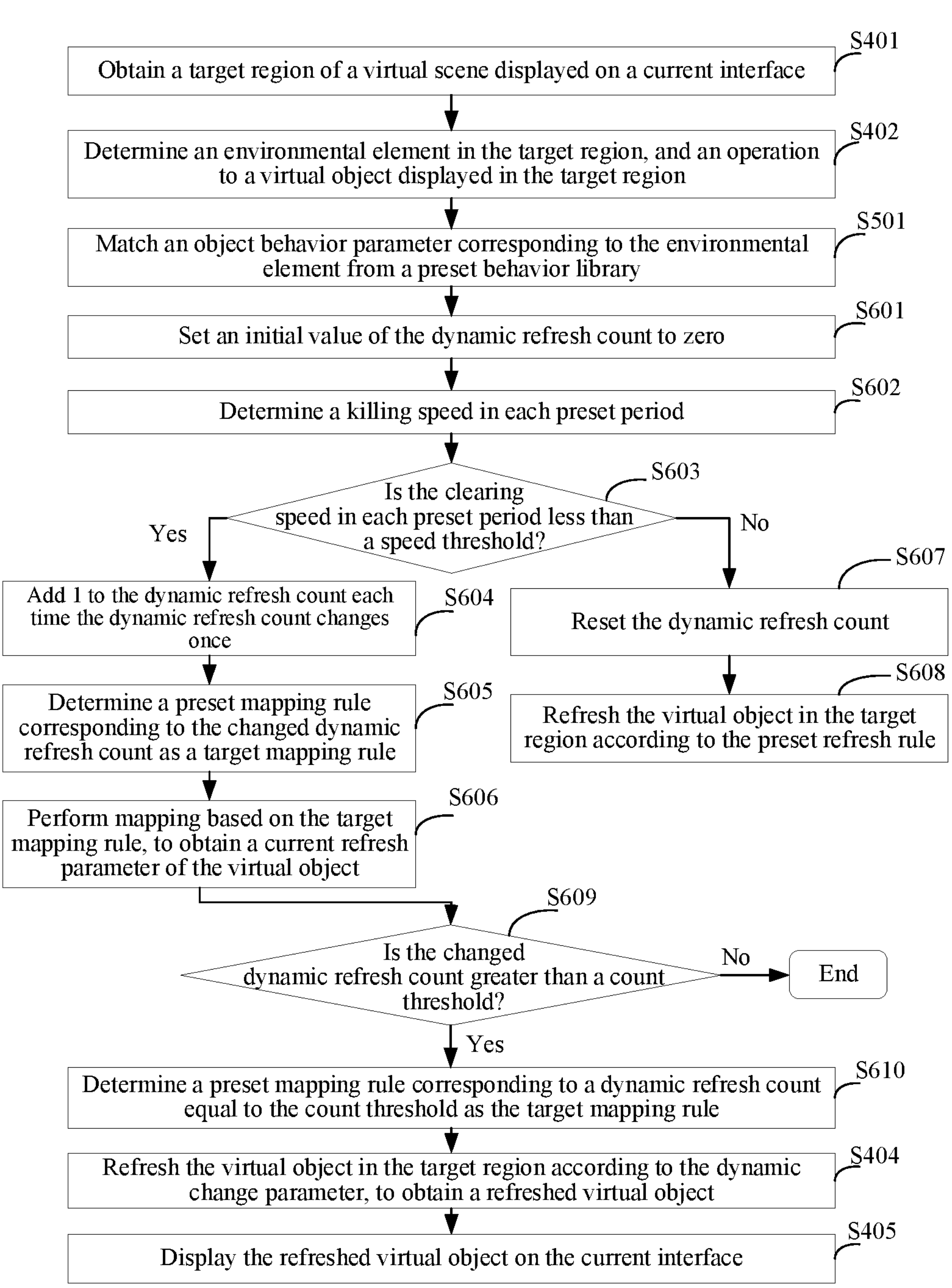
FIG. 6 is a schematic flowchart of another implementation of a virtual object dynamic change method according to an embodiment of this application.

In some embodiments, the preset mapping rule includes: at least one preset mapping rule corresponding to a dynamic refresh count. Based on FIG. 5, FIG. 6 is a schematic flowchart of another implementation of a virtual object dynamic change method according to an embodiment of this application. As shown in FIG. 6, step S502 may be implemented by the following steps:

Step S601. Set an initial value of the dynamic refresh count to zero.

The dynamic refresh count refers to a quantity of times that an attribute parameter of the virtual object in the target region changes. The attribute parameter of the virtual object includes, but is not limited to: virtual object quantity, virtual object type, virtual object type attribute, virtual object group quantity, corresponding defense facility, distribution region, and the like.

At the beginning of the game, the dynamic refresh count may be preset to 0, or after the player arrives at a new region, a dynamic refresh count of the region is set to 0.

Step S602. Determine a killing speed in each preset period.

The preset period corresponds to a unit duration. For example, the preset period may be 30 seconds or 1 minute, and the killing speed of the player is detected once in each preset period. The killing speed may be implemented as how many virtual objects are killed by player during the preset period, or how fast a player clears all virtual objects, or how fast a player kills one virtual object.

Step S603. Sequentially determine whether the killing speed in each preset period is less than a speed threshold.

When a determining result is yes, it indicates that there is at least one preset period, and the killing speed in the preset period is less than the speed threshold. At this time, step S604 is performed. When the determining result is no, it indicates that the killing speed in any preset period is greater than or equal to the speed threshold, and the player is operating the region, that is, the player is focusing on the region. At this time, step S607 is performed.

Step S604. Add 1 to the dynamic refresh count each time the dynamic refresh count changes once.

Step S605. Determine a preset mapping rule corresponding to the changed dynamic refresh count as a target mapping rule.

The preset mapping rule corresponding to the changed dynamic refresh count is determined as the target mapping rule. For example, if the changed dynamic refresh count is 3, a preset mapping rule when the dynamic refresh count is 3 is determined as the target mapping rule.

In some embodiments, rule content of a preset mapping rule corresponding to each dynamic refresh count may be preset. After the current changed dynamic refresh count is determined, the rule content of the preset mapping rule corresponding to the dynamic refresh count is used as a basis for determining the current refresh parameter.

In some embodiments, step S605 may be implemented by the following steps: Step S6051. Determine a current dynamic refresh count. Step S6052. Determine a preset mapping rule corresponding to the current dynamic refresh count as the target mapping rule.

Step S606. Perform mapping according to the target mapping rule, to obtain a current refresh parameter of the virtual object.

After the target mapping rule is obtained, mapping is performed according to rule content of the target mapping rule, to obtain the current refresh parameter. For example, if the target mapping rule specifies that a current monster quantity is 10, and every 5 monsters form a monster cluster, it can be obtained that the current refresh parameter is that the monster quantity is 10, and the 10 monsters correspond to two monster clusters.

In this embodiment of this application, if the killing speed in the preset period is less than the speed threshold, it indicates that the player does not focus on the region. Therefore, difficulty of the region can be upgraded to attract the player, or to make the player operate the region as soon as possible, so as to avoid a situation that it is difficult to clear the monsters in the region due to continuous upgrading of the difficulty of the region. Correspondingly, if the killing speed in the preset period is less than the speed threshold, the current update parameter obtained through mapping according to the determined target mapping rule upgrades the difficulty of clearing monsters in the target region.

In an alternative embodiment of this application, difficulty of the region can be upgraded in response to the killing speed being higher than the speed threshold, such that the region is more challenging to the player.

Step S607. Reset the dynamic refresh count.

When the killing speed in any preset period is greater than or equal to the speed threshold, it indicates that the player is operating on the region, that is, the player is focusing on the region. Therefore, operation difficulty of the region may not be upgraded, that is, the dynamic refresh count is reset.

Step S608. Refresh the virtual object in the target region according to the preset refresh rule.

The preset refresh rule corresponds to a refresh rule when the dynamic refresh count is 0. That is, when the dynamic refresh count is reset, the virtual object is uniformly refreshed according to the preset refresh rule. The preset refresh rule may be refreshing the virtual object in the target region according to a certain rule, a certain period, or a certain quantity. The virtual object quantity and type after each refresh are the same as those after a previous refresh according to the preset refresh rule.

Still referring to FIG. 6, in some embodiments, the method may further include the following steps:

Step S609. Determine whether the changed dynamic refresh count is greater than a count threshold.

When a determining result is yes, it indicates that the dynamic refresh count has reached an upper limit, and the dynamic change cannot be continued. At this time, step S610 is performed. When the determining result is no, it indicates that the dynamic refresh count has not reached the upper limit. At this time, the process ends.

Step S610. Determine a preset mapping rule corresponding to a dynamic refresh count equal to the count threshold as the target mapping rule.

When the changed dynamic refresh count is greater than the count threshold, it indicates that the change has reached the upper limit, and the dynamic change cannot be continued, that is, operation difficulty of the target region cannot be increased continuously, so as to avoid exceeding game performance limit. Therefore, at this time, the preset mapping rule corresponding to the dynamic refresh count equal to the count threshold is determined as the target mapping rule.

In some embodiments, the dynamic refresh count includes a first dynamic refresh count and a second dynamic refresh count. The first dynamic refresh count corresponds to a first preset mapping rule, and the second dynamic refresh count corresponds to a second preset mapping rule. Mapping is performed according to the first preset mapping rule to obtain a first refresh parameter, and mapping is performed according to the second preset mapping rule to obtain a second refresh parameter. A virtual object refreshed using the first refresh parameter is cleared to obtain a first reward value, and a virtual object refreshed using the second update parameter is cleared to obtain a second reward value. If the first dynamic refresh count is less than the second dynamic refresh count, the first reward value is less than the second reward value.

Figure 7:
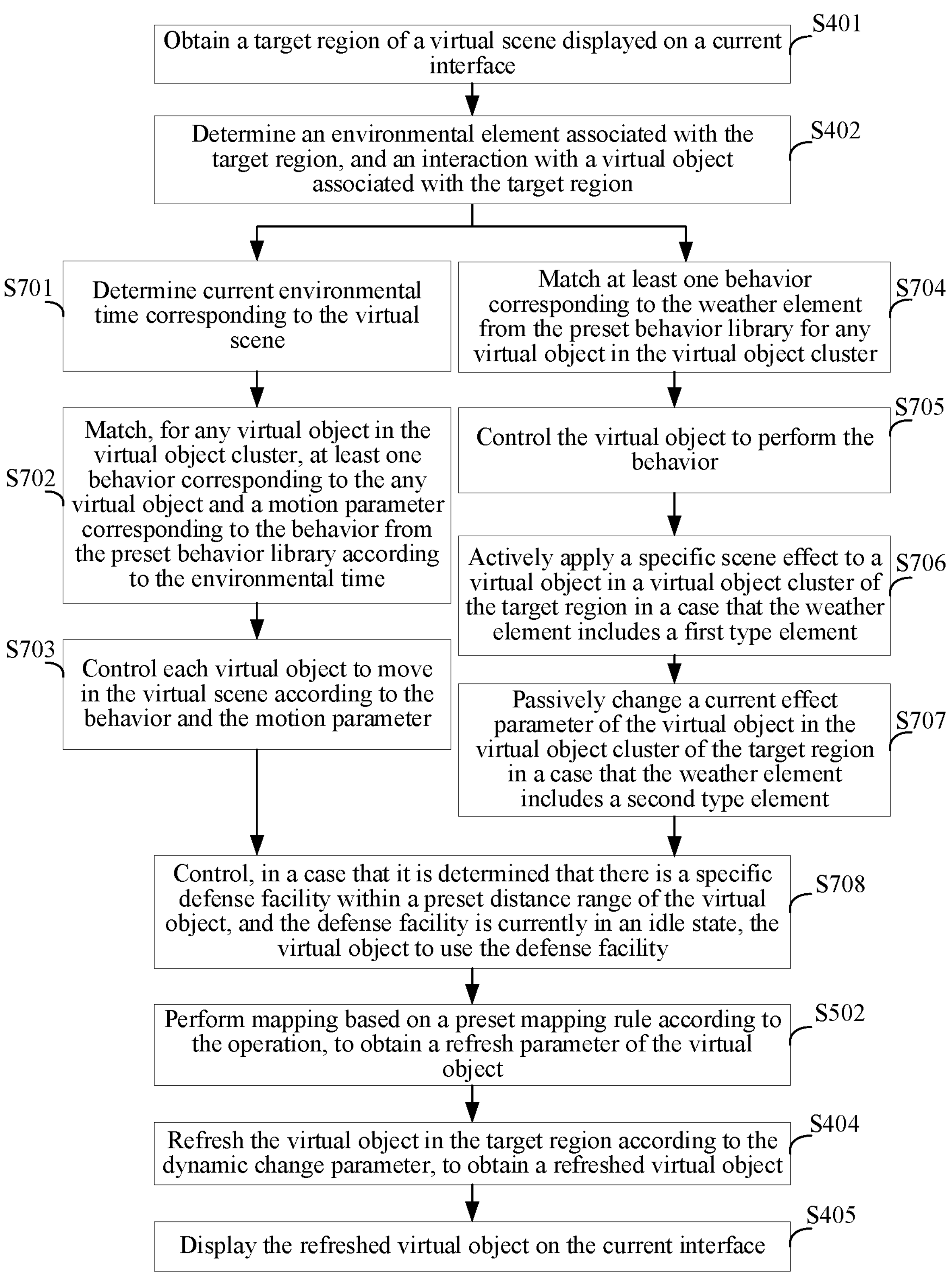
FIG. 7 is a schematic flowchart of another implementation of a virtual object dynamic change method according to an embodiment of this application.

Based on FIG. 5, FIG. 7 is a schematic flowchart of another implementation of a virtual object dynamic change method according to an embodiment of this application. In some embodiments, at least one virtual object cluster is displayed in the target region, and each virtual object cluster includes at least one virtual object. The environmental element includes at least: environmental time. As shown in FIG. 7, step S501 may be implemented by the following steps:

Step S701. Determine current environmental time corresponding to the virtual scene.

The environmental time includes, but is not limited to: morning, forenoon, noon, afternoon, evening, night, and the like.

Step S702. Match, for any virtual object in the virtual object cluster, at least one behavior corresponding to the any virtual object and a motion parameter corresponding to the behavior from the preset behavior library according to the environmental time.

The preset behavior library further stores a mapping relationship between the environmental time and a corresponding behavior, and a mapping relationship between the behavior and the motion parameter. After the environmental time is determined, for each virtual object, one behavior and a motion parameter corresponding to the behavior can be matched from the preset behavior library, and at least one matched behavior and the motion parameter corresponding to the behavior are determined as an object behavior parameter corresponding to the environmental element.

For different virtual objects in the same virtual object cluster, behaviors obtained through matching can be the same or different, and motion parameters may be the same or different. That is, different virtual objects may have different behaviors and motion parameters, or same behavior but different motion parameters under the same environmental time.

Different virtual object clusters may have the same or different behaviors and motion parameters. Alternatively, for different virtual object clusters, all virtual objects in the same virtual object cluster have the same behavior and motion parameter, while virtual objects in different virtual object clusters have different behaviors and motion parameters.

Step S703. Control each virtual object to move in the virtual scene according to the behavior and the motion parameter.

After the behavior and motion parameter of the virtual object are determined, the virtual object is controlled to move in the virtual scene according to the behavior and motion parameter of each virtual object.

Still referring to FIG. 7, in some embodiments, at least one virtual object cluster is displayed in the target region, and each virtual object cluster includes at least one virtual object. The environmental element includes at least: a weather element. Step S501 may further be implemented by the following steps:

Step S704. Match at least one behavior corresponding to the weather element from the preset behavior library for any virtual object in the virtual object cluster.

The weather element includes, but is not limited to: weather elements such as sunny day, rainy day, snowy day, thunder and lightning, hail, and strong wind. The preset behavior library further stores a mapping relationship between the weather element and the behavior.

In this embodiment of this application, after a current weather element in the target region is determined, at least one behavior corresponding to the weather element is matched from the preset behavior library, and the behavior is given to each virtual object, that is, the matched behavior is determined as an object behavior parameter.

Under the same weather element, different virtual objects may have the same or different behaviors. For example, in a thunder and lightning weather, some monsters quickly hide under a shelter to avoid thunder and lightning, and some monsters quickly escape under thunder and lightning. For another example, in a rainy weather, some monster may enter a facility and take a shelter from the rain.

Step S705. Control the virtual object to perform the behavior.

In this embodiment of this application, after at least one behavior corresponding to the weather element is determined, these behaviors are given to virtual objects in the target region, and virtual objects in the target region are controlled to perform the behaviors.

Still referring to FIG. 7, in some embodiments, when the environmental element includes the weather element, the method further includes the following steps:

Step S706. Actively apply a specific scene effect to a virtual object in a virtual object cluster of the target region when the weather element includes a first type element.

The first type element may be a weather element that can actively affect a monster in the target region, for example, the thunder and lightning weather. In the thunder and lightning weather, a lightning strike occasionally occurs, and the lightning strike attacks the monster, causing the monster to lose HP.

Step S707. Passively change a current effect parameter of the virtual object in the virtual object cluster of the target region when the weather element includes a second type element.

The second type element is a weather element under which the virtual object is passively affected. For example, if the sight of the monster is blocked on a foggy day, its alert range decreases, or a moving speed of the monster on a rainy day decreases due to resistance of heavy rain.

Still referring to FIG. 7, in some embodiments, an environmental factor may further include a defense facility. Correspondingly, the method may further include the following steps:

Step S708. Control, when it is determined that there is a specific defense facility within a preset distance range of the virtual object, and the defense facility is currently in an idle state, the virtual object to use the defense facility.

If there is a specific defense facility near the monster (that is, within the preset distance range) and the defense facility is currently in an idle state, the virtual object can use the defense facility. For example, in a battle state, if there is a cheval de frise near the monster, the monster can choose to move behind the cheval de frise to attack the player, or if there is a carrier near the monster, the monster can choose to ride the carrier to escape or patrol, or if there is an artillery battery nearby, the monster may choose to operate the battery to attack.

According to the virtual object dynamic change method provided in the embodiments of this application, different environmental elements correspond to different control strategies, so that the monster can present different states under different weathers, which is closer to a real situation, and makes the game scene present diverse dynamic changes, which is more vivid, and provides the player with an immersive game experience, thereby attracting more players more effectively.

The following describes an exemplary application of this embodiment of this application in an actual application scenario.

An embodiment of this application provides a virtual object dynamic change method, applied to an MMORPG game. In the game, a monster on a map is within a certain range. Monsters of the same type serve as a monster cluster, and the monster cluster changes according to time, weather, defense facility, and killing speed for the monster cluster by the player. The time, weather and defense facility affect behavior pattern AI of the monster, and a killing speed for the monster cluster by the player affects refresh related mechanisms such as monster quantity, type, and distribution, and appearance matched with the defense facility.

The time affects the behavior pattern AI of the monster, which can be reflected in the following aspects: Day and night change is set in the game, and is repeated from dawn, day to dusk and then to night. A monster behavior changes over time, which makes the monster look more like a real creature.

Figure 8:
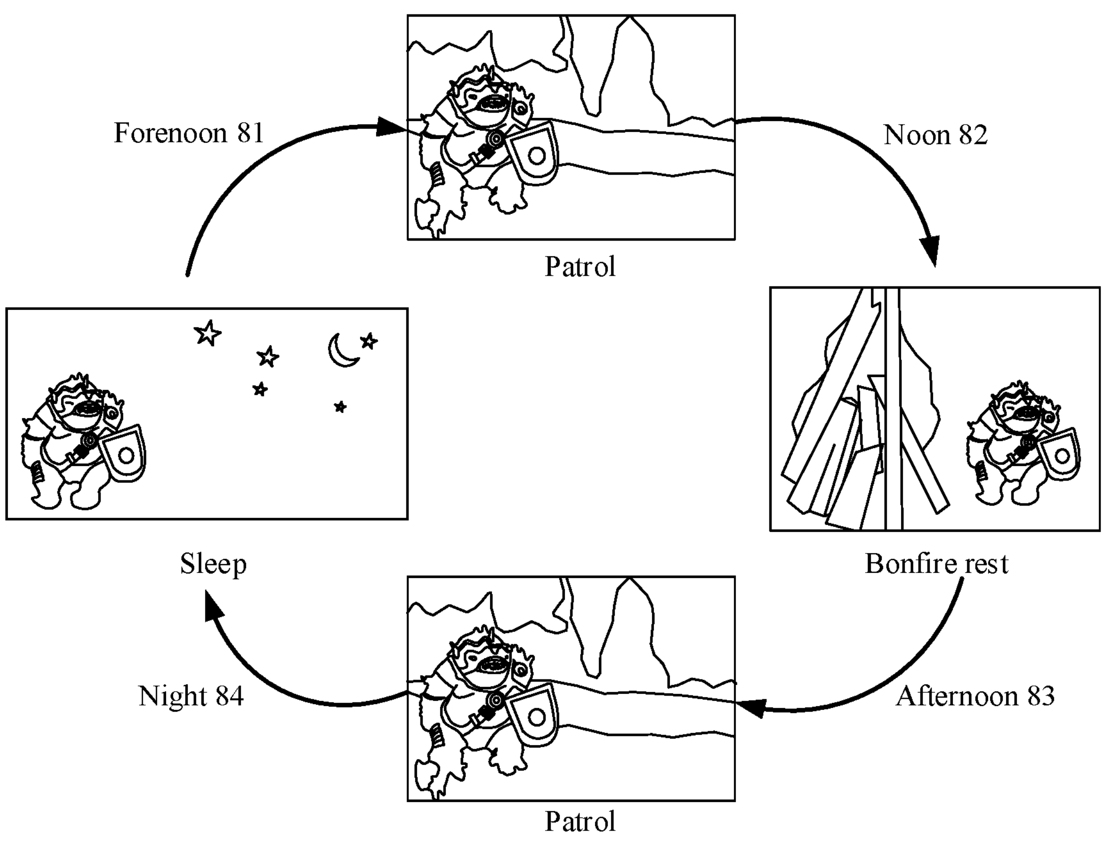
FIG. 8 is a game interface diagram in which monster AI changes according to a time change of a day according to an embodiment of this application.

FIG. 8 is a game interface diagram in which monster AI changes according to a time change of a day according to an embodiment of this application. As shown in FIG. 8, in forenoon 81, the monster comes out of a cave and starts patrolling. At noon 82, the monster returns near to a bonfire, sits down and eats. At the same time, the monster determines a quantity of monsters near the bonfire. If there are relatively too many monsters, the monster does not come first and continues to patrol. In afternoon 83, the monster patrols. At night 84, some monsters return to their caves or sleep by the bonfire, while a few remain in a patrolling state.

Figure 9:
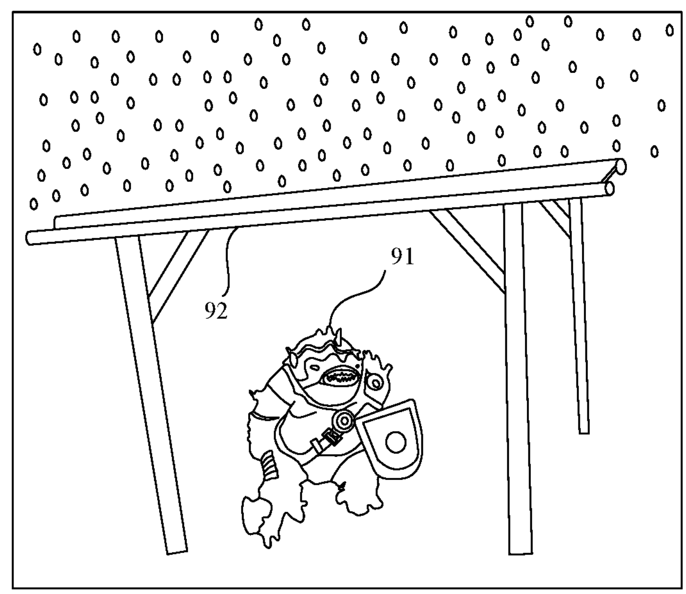
FIG. 9 is a game interface diagram in which a monster takes shelter from rain according to an embodiment of this application.
Figure 10:
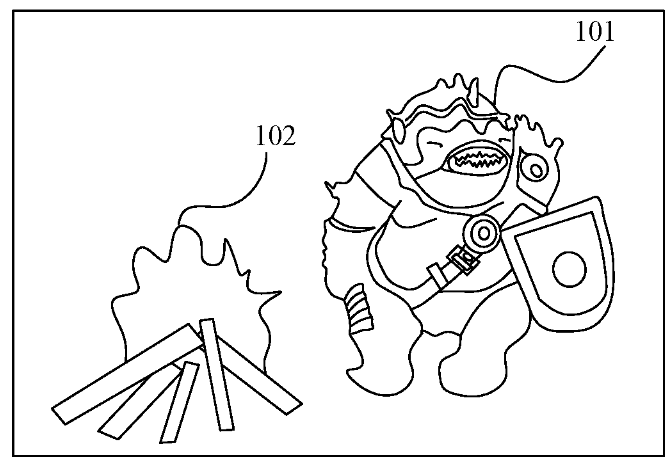
FIG. 10 is a game interface diagram in which a monster warms itself up on a snowy day according to an embodiment of this application.
Figure 11:
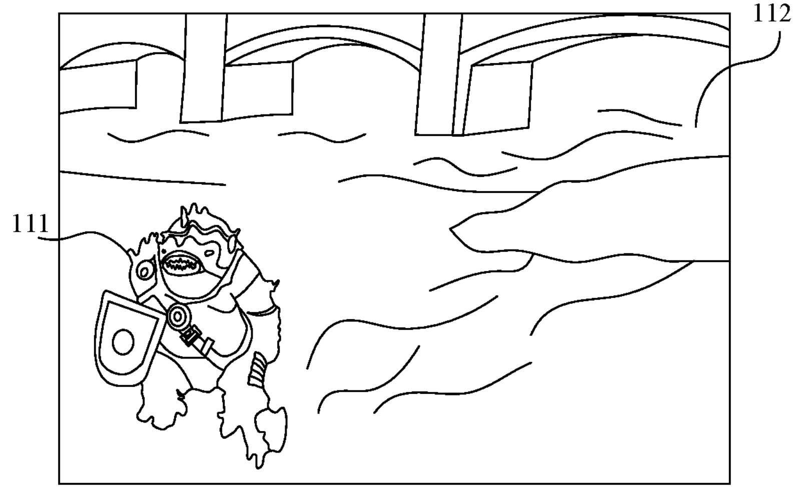
FIG. 11 is a game interface diagram in which a monster escapes according to an embodiment of this application.

In some embodiments, weather changes from time to time in a scene in the game, and the monster changes dynamically according to the weather change. In this embodiment of this application, the monster behavior matches the weather change, and the monster has different behaviors under different weather conditions. For example, on a sunny day, the monster behavior is basic behavior logic. On a rainy day, some monsters give up patrolling and seek shelter from rain nearby. FIG. 9 is a game interface diagram in which a monster takes shelter from rain according to an embodiment of this application. As shown in FIG. 9, a monster 91 chooses to hide under a shelter 92 on the rainy day. On a snowy day, some monsters give up patrolling and move to the bonfire instead. FIG. 10 is a game interface diagram in which a monster warms itself up on a snowy day according to an embodiment of this application. As shown in FIG. 10, a monster 101 stays beside a bonfire 102 to warm itself up. When a fire is caught, the monster escapes from the fire region, or attempts to put out the fire. FIG. 11 is a game interface diagram in which a monster escapes according to an embodiment of this application. As shown in FIG. 11, a monster 111 escapes from a fire scene 112 when a fire occurs.

Figure 12:
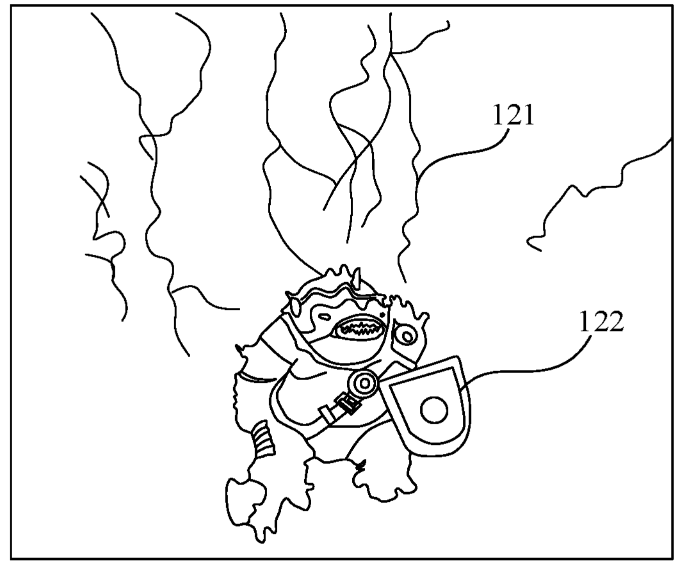
FIG. 12 is a game interface diagram in which a monster is struck by lightning on a thunderstorm day according to an embodiment of this application.
Figure 13:
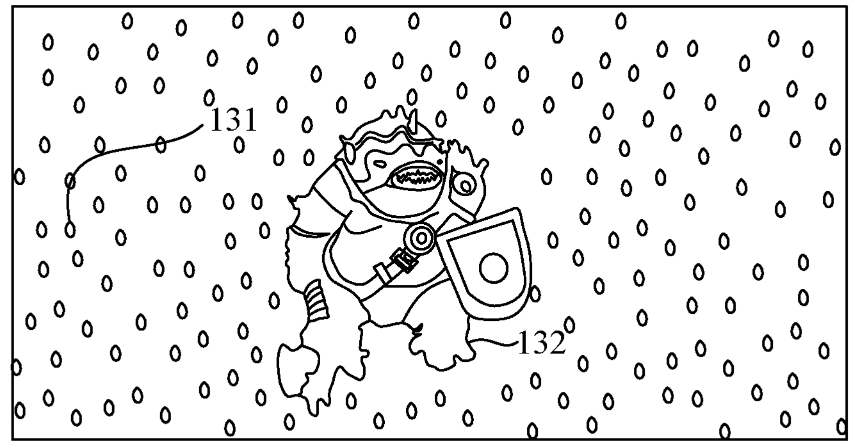
FIG. 13 is a game interface diagram in which a moving speed decreases on a rainy day according to an embodiment of this application.

In some embodiments, the weather condition also actively affects the monster. A scene triggers a specific effect to affect the monster in the region according to the weather condition, including an active effect and a passive effect. The active effect includes: on a thunderstorm day, a lightning strike occasionally occurs, and attacks the monster to cause it to lose HP. FIG. 12 is a game interface diagram in which a monster is struck by lightning on a thunderstorm day according to an embodiment of this application. As shown in FIG. 12, after thunder and lightning 121 attacks a monster 122, the monster 122 loses HP. The passive effect includes: on a snowy day, the alert range of the monster decreases; and on a rainy day, the moving speed of the monster decreases. FIG. 13 is a game interface diagram in which a moving speed decreases on a rainy day according to an embodiment of this application. As shown in FIG. 13, a moving speed of a monster 132 decreases on a rainy day 131.

Figure 14:
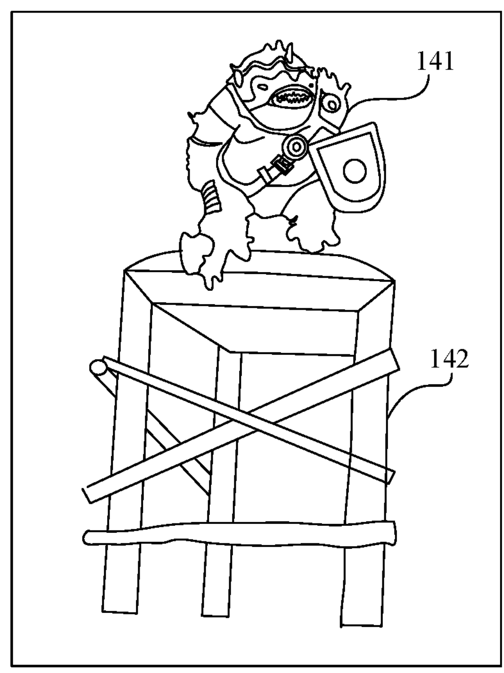
FIG. 14 is a game interface diagram in which a monster automatically climbs up a sentry tower according to an embodiment of this application.
Figure 15:
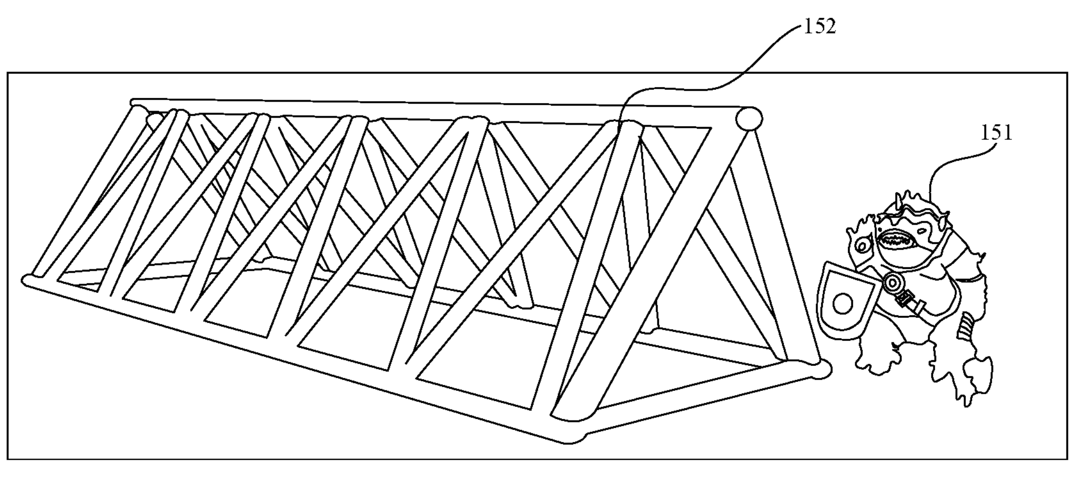
FIG. 15 is a game interface diagram in which a long-range monster stands behind a cheval-de-frise in a battle according to an embodiment of this application.

In some embodiments, the defense facility also affects the monster AI. If there is an idle defense facility in a region where the monster is located, the monster AI determines whether to go to the defense facility to control. According to a type of the defense facility, the monster has different determinations according to its own type. Some defense facilities are used by a monster in a non-battle state, while some defense facilities are used only in a battle state. For example, the defense facility includes at least one of the following: sentry tower, carrier, cheval de frise, and artillery. When there is a sentry tower in the virtual scene, if there is no one in the sentry tower, a remote monster chooses to enter the sentry tower. If it is rainy, a melee monster also enters the sentry tower. FIG. 14 is a game interface diagram in which a monster automatically climbs up a sentry tower according to an embodiment of this application. As shown in FIG. 14, a monster 141 automatically climbs up a sentry tower 142. When there is a carrier in the virtual scene, a patrol monster chooses to ride the carrier and continues to patrol. When there is a cheval de frise in the virtual scene, the monster enters the battle state, and the remote monster chooses to move behind the cheval de frise to attack the player. FIG. 15 is a game interface diagram in which a long-range monster stands behind a cheval de frise in a battle according to an embodiment of this application. As shown in FIG. 15, a monster 151 moves behind a cheval de frise 152 to attack the player. When there is an artillery in the virtual scene, the monster enters the battle state. If the melee monster is far away from the player, the melee monster chooses to move to an artillery position and uses the artillery to attack.

In some embodiments, the killing speed for the monster by the player also has an impact on monster refresh. A determination is performed every fixed time in the game. When the killing speed is lower than a threshold, the monster cluster triggers the dynamic change.

Figure 16:
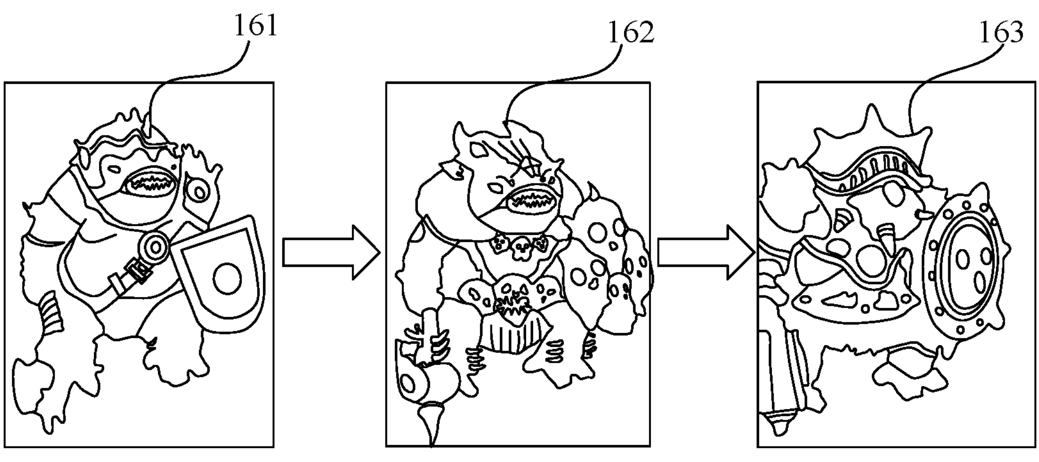
FIG. 16 is a schematic diagram of different levels of monsters according to an embodiment of this application.

In some embodiments, the dynamic change may be emergence of a powerful monster. For example, the monster group quantity increases, and an elite monster begins to appear. If several consecutive determinations trigger the dynamic change, a boss monster occurs. FIG. 16 is a schematic diagram of different levels of monsters according to an embodiment of this application. As shown in FIG. 16, an initial monster 161 is a common monster on the map. When a dynamic change is triggered, an elite monster 162 appears. The elite monster has a higher level than the initial monster 161 and is more difficult to clear. After the dynamic change is triggered again, a boss monster 163 appears. The boss monster 163 has a higher level than the elite monster 162 and is more difficult to clear.

Figure 17:
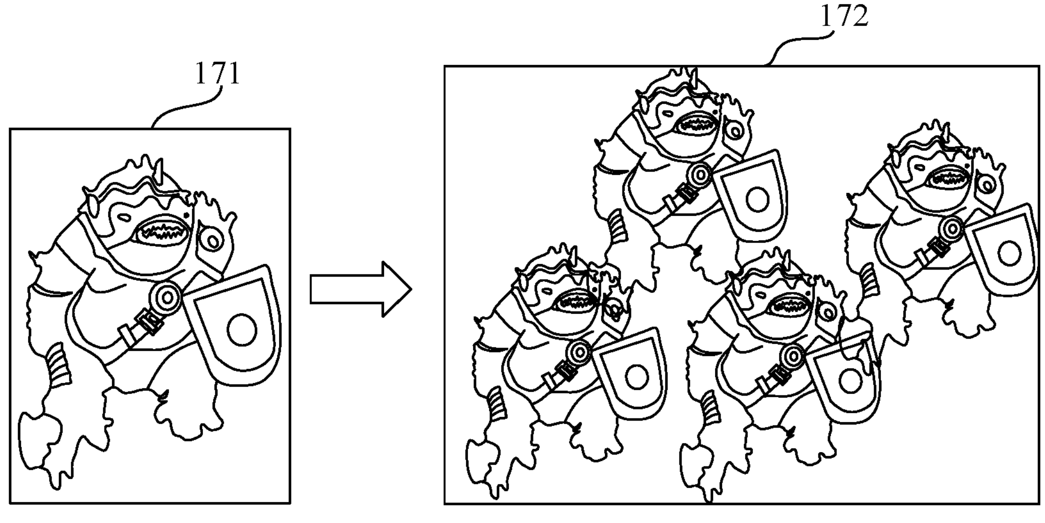
FIG. 17 is a schematic diagram in which a monster cluster appears according to an embodiment of this application.

In some embodiments, the dynamic change may also be that a monster cluster appears, that is, a monster who originally acts alone is refreshed to become a cluster of 2 to 3 monsters. Monsters in the monster cluster may enter a battle at the same time when the player attacks. FIG. 17 is a schematic diagram in which a monster cluster appears according to an embodiment of this application. As shown in FIG. 17, a single monster 171 is refreshed to a monster cluster 172 after a dynamic change, and the monster cluster 172 includes a plurality of monsters.

Figures 18, 19, 20:
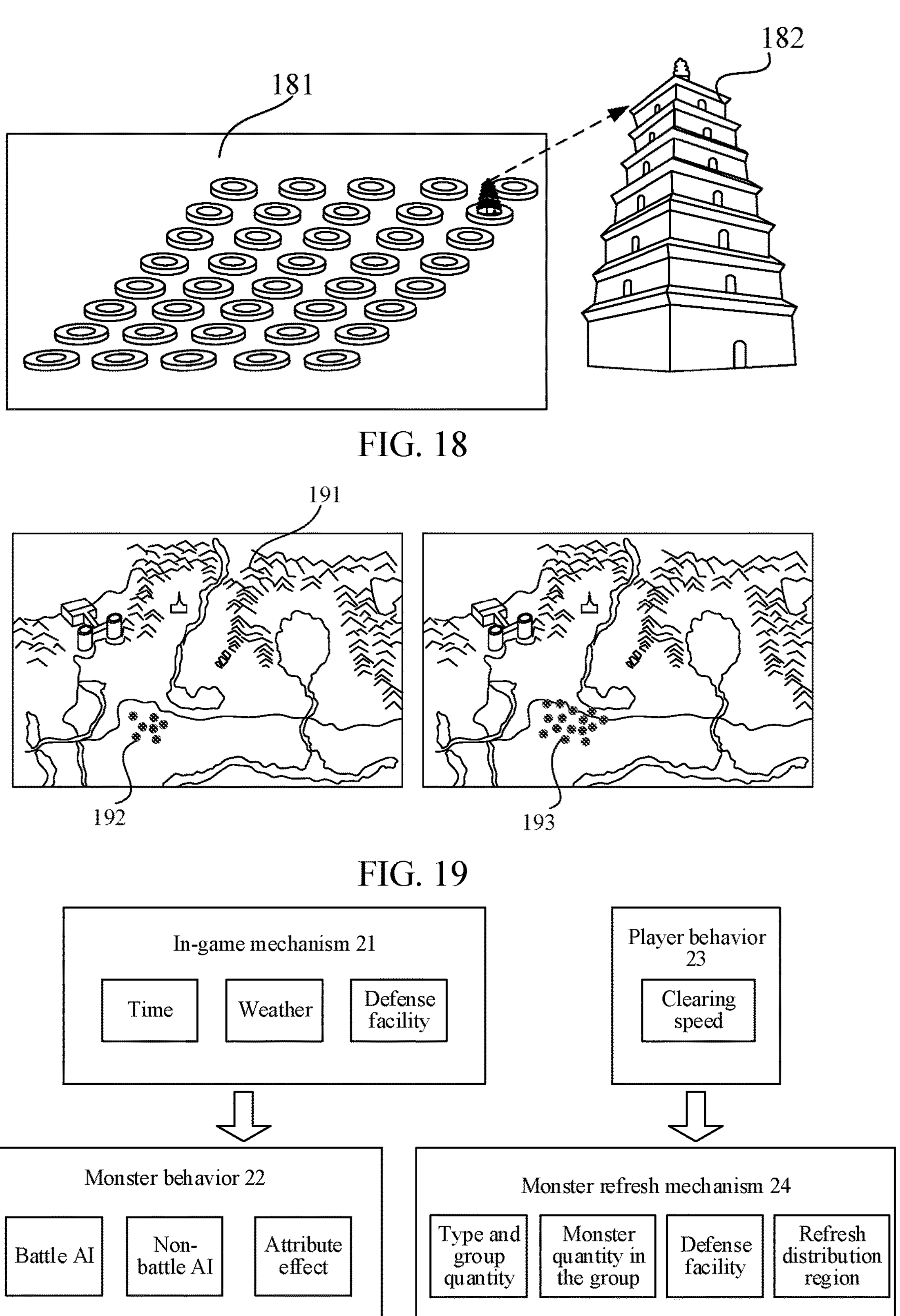
FIG. 18 is a schematic diagram in which a defense building appears in a scene according to an embodiment of this application.
FIG. 19 is a schematic diagram in which a monster cluster distribution gradually expands according to an embodiment of this application.
FIG. 20 is an architectural diagram of a monster refresh mechanism according to an embodiment of this application.

In some embodiments, the dynamic change may also be that a defense building, such as sentry tower or cheval de frise, appears in a monster site, and this type of buildings may be killed. FIG. 18 is a schematic diagram in which a defense building appears in a scene according to an embodiment of this application. As shown in FIG. 18, a defense building 182 appears in a monster site 181. The right figure in FIG. 18 is an enlarged view of the defense building 182.

In some embodiments, the dynamic change may also be that a monster cluster distribution region expands, and even penetrates into a player town to form a monster siege. FIG. 19 is a schematic diagram in which a monster cluster distribution gradually expands according to an embodiment of this application. As shown in FIG. 19, in a monster site 191, there is a first monster cluster 192 with a few monsters. After a dynamic change, the monster cluster distribution region expands to form a second monster cluster 193, and a monster quantity in the second monster cluster 193 is larger than that in the first monster cluster 192.

The dynamic change mechanism provided in the embodiments of this application is applicable to a game with a large map mode.

In some embodiments, a backend mechanism of a dynamic change of monsters on a large map is divided into two parts according to impact types, one part affects the monster AI, and the other part affects a refresh rule. FIG. 20 is an architectural diagram of a monster refresh mechanism according to an embodiment of this application. As shown in FIG. 20, an in-game mechanism 21 (that is, a game scene change element) affects a monster behavior 22, and an interaction 23 affects a monster refresh mechanism 24. The in-game mechanism 21 includes, but is not limited to, time, weather and defense facility. The monster behavior 22 includes, but is not limited to, battle AI, non-battle AI, and attribute effect, that is, AI and attribute of a monster non-player character (NPC). The operation 23 includes, but is not limited to, a killing speed. The monster refresh mechanism 24 includes, but is not limited to, group type and quantity, monster quantity in a group, defense facility, and refresh distribution region.

Figure 21:
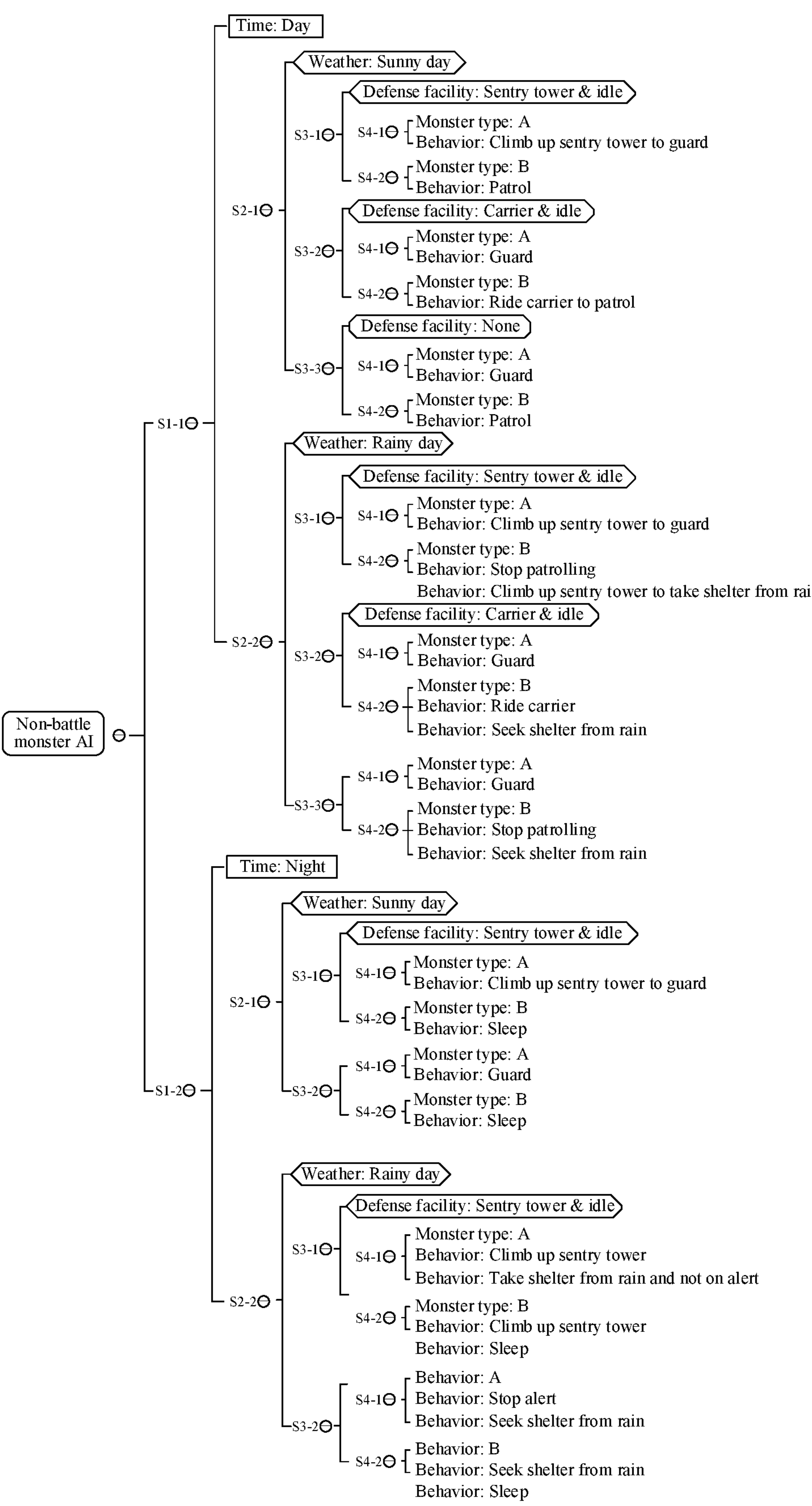
FIG. 21 is an architectural diagram of a behavior tree mode of monster AI according to an embodiment of this application.

In this embodiment of this application, time, weather, and defense facility affect monster AI logic. The monster AI implements determination in a behavior tree mode. Elements such as time, weather, and defense facility that may appear in game presetting are added to the behavior tree as a determination condition, to affect behaviors of different types of monsters. FIG. 21 is an architectural diagram of a behavior tree mode of monster AI according to an embodiment of this application. The behavior tree structure shown in FIG. 21 has different behaviors for non-battle monster AI under different time and different weather conditions.

In this embodiment of this application, the weather can actively affect the monster effect attribute, and an effect actively affected by the weather can be preset. When the weather changes, all monsters in a scene range where the weather is located may be affected and change accordingly. Table 1 is a table of a corresponding relationship between weather and an impact effect provided in this embodiment of this application. As shown in Table 1, on a sunny day, the weather has no active impact effect on the monster AI. On a rainy day, a moving speed of the monster decreases. On a thunderstorm day, the moving speed of the monster decreases, and there is a probability that lightning strikes. If the lightning strikes the monster, the monster suffers damage. On a snowy day, an alert range of the monster decreases and attack of the monster decreases.

TABLE 1

Table of corresponding relationship between weather and impact effect

| Weather | Effect |
|---|---|
| Sunny day | None |
| Rainy day | Moving speed decreases |
| Thunderstorm | Moving speed decreases<br>There is a probability of lightning strike. If it strikes the monster, the monster suffers damage. |
| Snowy day | Alert range of the monster decreases<br>Attack of the monster decreases |

In this embodiment of this application, a killing speed of the player affects the monster distribution, a game server or terminal uses the monster cluster as a unit, and each monster cluster is configured with the following parameter: A killing speed and a consecutive change count. The consecutive change count refers to a quantity of times of continuously triggering the dynamic change. The server or terminal performs a determination every period of time, that is, records a quantity of monsters killed in the period of time, uses the quantity of killed monsters as the killing speed, and compares it with a critical value (that is, the speed threshold). If the killing speed is greater than or equal to the critical value, it is performed according to a normal refresh rule, and the consecutive change count is reset. Otherwise, dynamic change logic is triggered, and the consecutive change count is continuously counted.

Figure 22:
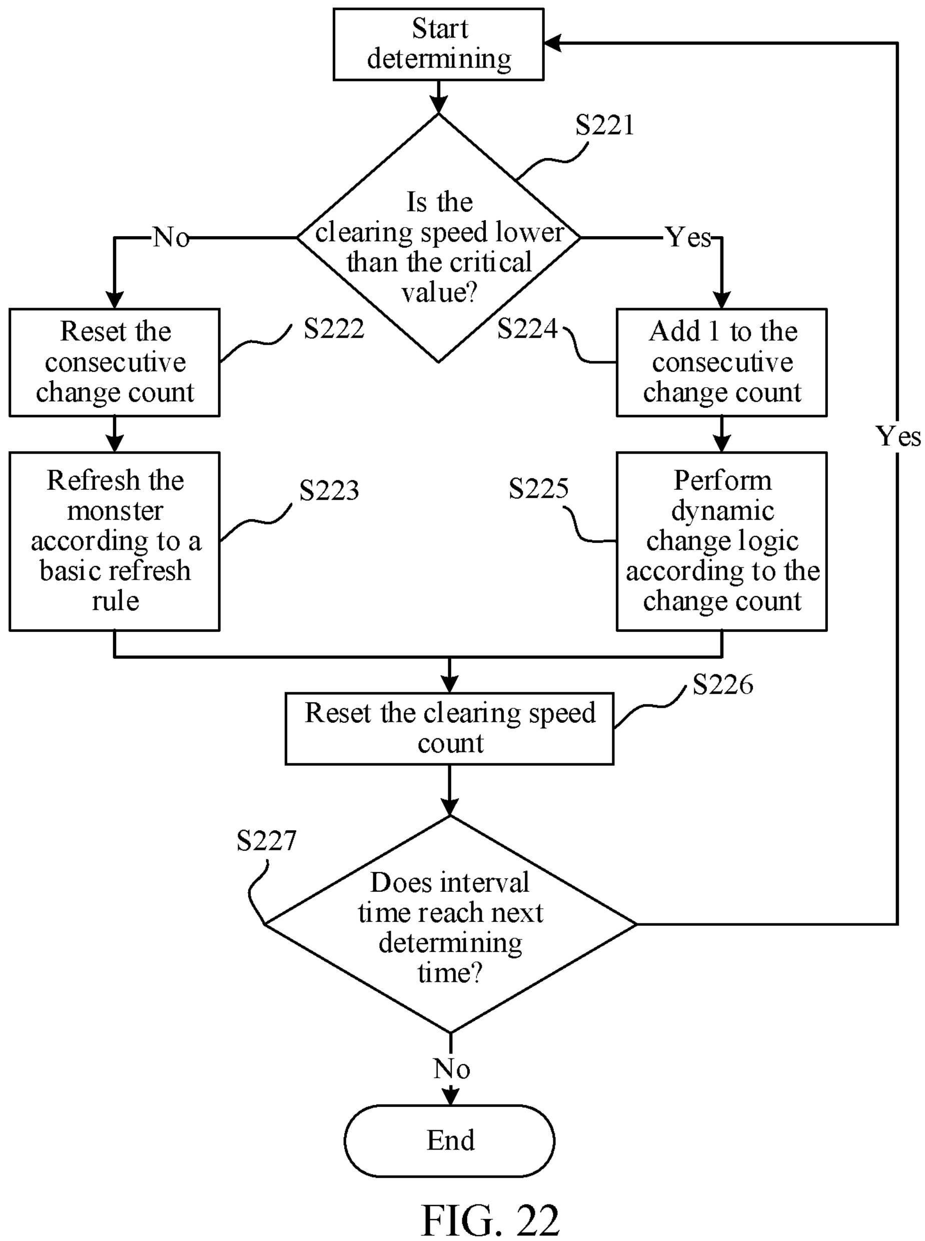
FIG. 22 is a schematic flowchart of an implementation of determining a killing speed of a monster region according to an embodiment of this application.

FIG. 22 is a schematic flowchart of an implementation of determining a killing speed of a monster region according to an embodiment of this application. As shown in FIG. 22, a determination process includes the following steps:

Step S221. Determine whether the killing speed is lower than the critical value.

If a determining result is yes, step S224 is performed. If the determining result is no, step S222 is performed.

Step S222. Reset the consecutive change count.

Step S223. Refresh the monster according to a basic refresh rule.

Step S224. Add 1 to the consecutive change count.

Step S225. Perform the dynamic change logic according to the consecutive change count.

Step S226. Reset the killing speed count.

Step S227. Determine whether interval time reaches next determining time.

If a determining result is yes, step S221 is performed. If a determining result is no, the process ends.

Figure 23:
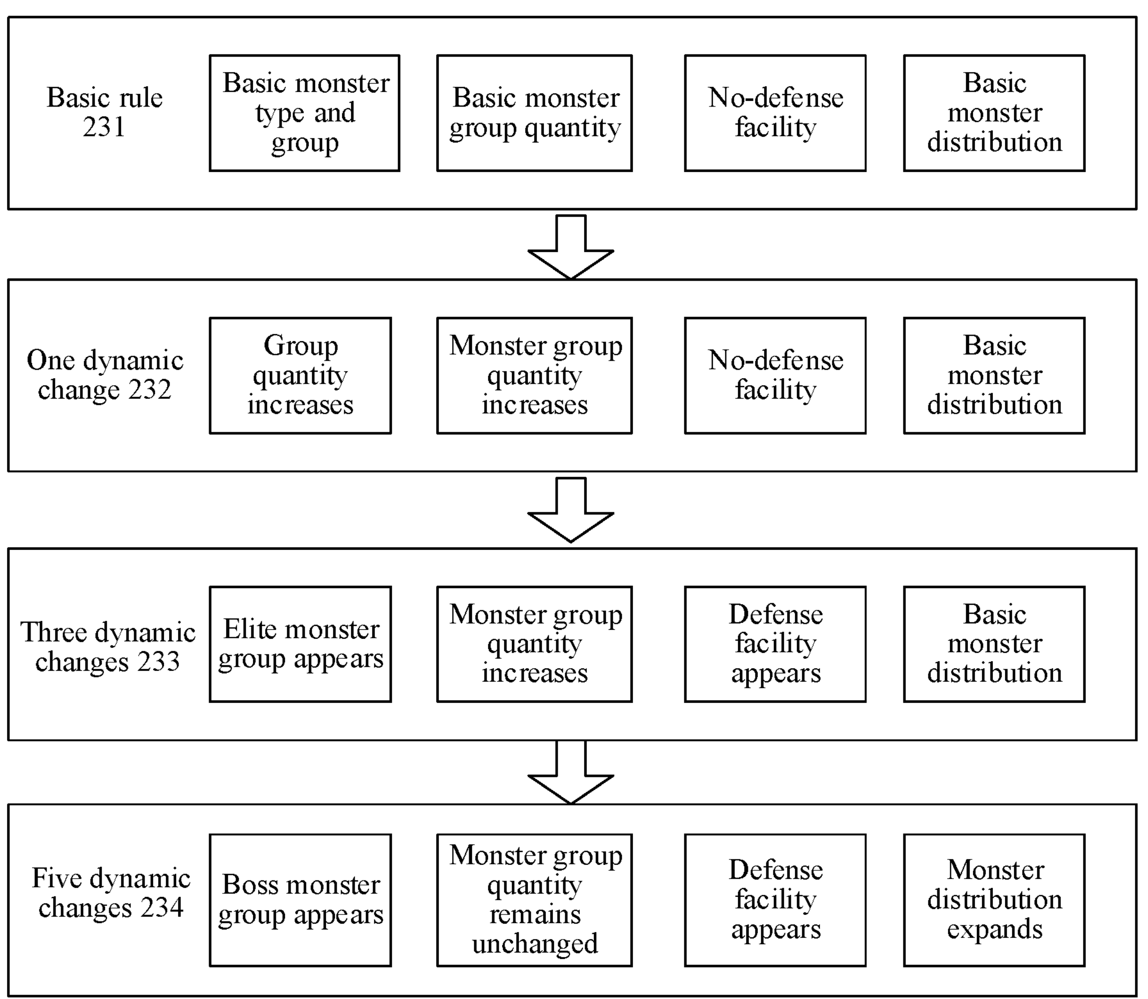
FIG. 23 is a schematic diagram of an implementation process of dynamic change logic according to an embodiment of this application.

In this embodiment of this application, the dynamic change logic is respectively performing logic such as monster type change, group change, defense facility change, and distribution region change according to the consecutive change count. FIG. 23 is a schematic diagram of an implementation process of dynamic change logic according to an embodiment of this application. As shown in FIG. 23, basic monster type and group, basic monster group quantity, no-defense facility, and basic monster distribution are configured in a basic rule 231. In one dynamic change 232, that group quantity increases, and monster group quantity increases, no-defense facility, and that basic monster distribution remains unchanged are configured. In three dynamic changes 233, that elite monster group appears, monster group quantity increases, defense facility appears, and basic monster distribution remains unchanged are configured. In five dynamic changes 234, that boss monster group appears, monster group quantity remains unchanged, defense facility appears, and monster distribution expands are configured.

In this embodiment of this application, in the dynamic change logic, the monster type and the group quantity are that increased monster group quantity and monster type (such as the elite monster or different breed) are set according to the consecutive change count. The monster group quantity is that the monster quantity in a certain proportion of groups is set according to the consecutive change count to increase the specified quantity, and the consecutive change count increases a proportion of increased quantity groups and a quantity of increased single groups. The defense facility is that increase is set to trigger after a certain consecutive change count, and increased setting types and a position where the defense facility may appear are set. The monster distribution is that the expansion of distribution region is set to trigger after a certain consecutive change count, and regions at a plurality of levels are preset for the monster cluster distribution region. The regions are upgraded from a current level to a next level when expanding, and then expand again when a count of a set requirement is reached according to the consecutive change count.

The foregoing changes change according to a set stage, and do not continue to change when a set upper limit is reached, so as to avoid exceeding a performance limit. The dynamic change refreshes and changes only after it is determined to be successful. If the dynamic change refreshes because the player kills the monster between two determinations, an ordinary monster group is refreshed to supplement at this time according to a current distribution region.

The monster refresh method (that is, the virtual object dynamic change method) provided in the embodiments of this application makes the whole world of the game present diverse dynamic changes, and makes the player feel that the game scene is real, and the operation has an impact on the world. In addition, the dynamic change may increase difficulty of a region that some players no longer focuses on, and attracts the attention of the players again, which improves utilization of game scene resources.

The following continues to describe an exemplary structure of a software module that a virtual object dynamic change apparatus 354 provided in the embodiments of this application is implemented as. In some embodiments, as shown in FIG. 3, the software module stored in the virtual object dynamic change apparatus 354 in a memory 350 may be a virtual object dynamic change apparatus in a server 300, including:

an obtaining module 3541, configured to obtain a target region of a virtual scene displayed on a current interface; a first determining module 3542, configured to determine an environmental element associated with the target region, and an interaction with a virtual object associated with the target region; a second determining module 3543, configured to determine a dynamic change parameter of the virtual object according to the environmental element and the interaction; a refresh module 3544, configured to update the virtual object in the target region according to the dynamic change parameter, to obtain a updated virtual object; and a display module 3545, configured to display the updated virtual object on the current interface.

In some embodiments, the dynamic change parameter includes at least an object behavior parameter and a update parameter of the virtual object. The second determining module is further configured to: match an object behavior parameter corresponding to the environmental element from a preset behavior library; and perform mapping based on a preset mapping rule according to the operation, to obtain a update parameter of the virtual object. The update parameter includes at least one of the following: virtual object type, group quantity, corresponding defense facility, and distribution region.

In some embodiments, the preset mapping rule includes: at least one preset mapping rule corresponding to a dynamic refresh count; and the operation includes at least a speed of killing the virtual object. The second determining module is further configured to: determine a killing speed in each preset period; control the dynamic refresh count to change once when the killing speed in any preset period is less than a speed threshold; determine a preset mapping rule corresponding to the changed dynamic refresh count as a target mapping rule each time the dynamic refresh count changes once; and perform mapping according to the target mapping rule, to obtain a current update parameter of the virtual object.

In some embodiments, the apparatus further includes: a setting module, configured to set an initial value of the dynamic refresh count to zero; and a calculation module, configured to add 1 to the dynamic refresh count when the killing speed in any preset period is less than the speed threshold. The second determining module is further configured to: determine a current dynamic refresh count; and determine a preset mapping rule corresponding to the current dynamic refresh count as the target mapping rule.

In some embodiments, the apparatus further includes: a target mapping rule determining module, configured to determine, when the changed dynamic refresh count is greater than a count threshold, a preset mapping rule corresponding to a dynamic refresh count equal to the count threshold as the target mapping rule.

In some embodiments, the apparatus further includes a processing module, configured to reset the dynamic refresh count when the killing speed in any preset period is greater than or equal to the speed threshold, and refresh the virtual object in the target region according to a preset refresh rule.

In some embodiments, at least one virtual object cluster is displayed in the target region, and each virtual object cluster includes at least one virtual object. The environmental element includes at least: environmental time. The second determining module is further configured to: determine current environmental time corresponding to the virtual scene; match, for any virtual object in the virtual object cluster, at least one behavior corresponding to the any virtual object and a motion parameter corresponding to the behavior from the preset behavior library according to the environmental time; and determine the behavior and the motion parameter corresponding to the behavior as the object behavior parameter corresponding to the environmental element. The apparatus further includes: a first control module, configured to control each virtual object to move in the virtual scene according to the behavior and the motion parameter.

In some embodiments, at least one virtual object cluster is displayed in the target region, and each virtual object cluster includes at least one virtual object. The environmental element includes at least: a weather element. The second determining module is further configured to: match at least one behavior corresponding to the weather element from the preset behavior library for any virtual object in the virtual object cluster; and determine the behavior as the object behavior parameter. The apparatus further includes: a second control module, configured to control the virtual object to perform the behavior.

In some embodiments, the apparatus further includes: an applying module, configured to actively apply a specific scene effect to a virtual object in a virtual object cluster of the target region when the weather element includes a first type element; or a change module, configured to passively change a current effect parameter of the virtual object in the virtual object cluster of the target region when the weather element includes a second type element.

In some embodiments, the apparatus further includes: a third control module, configured to control, when it is determined that there is a specific defense facility within a preset distance range of the virtual object, and the defense facility is currently in an idle state, the virtual object to use a defense facility.

Descriptions of the apparatus embodiments of this application are similar to the descriptions of the method embodiments. The apparatus embodiments have beneficial effects similar to those of the method embodiments and therefore are not described in detail. For technical details that are not disclosed in the apparatus embodiments, refer to the descriptions of the method embodiments of this application for understanding.

An embodiment of this application provides a computer program product or a computer program. The computer program product or the computer program includes a computer instruction. The computer instruction is stored in a computer-readable storage medium. A processor of a computer device reads the computer instructions from the computer-readable storage medium. The processor executes the computer instructions, to cause the computer device to perform the virtual object dynamic change method in the embodiments of this application.

An embodiment of this application provides a storage medium storing executable instructions, the executable instructions, when executed by a processor, causing the processor to perform the virtual object dynamic change method provided in the embodiment of this application, for example, the method as shown in FIG. 4.

In some embodiments, the storage medium may be a computer-readable storage medium, such as a ferromagnetic random access memory (FRAM), a ROM, a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM); or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts). In an example, the executable instructions can be deployed for execution on one computing device, execution on a plurality of computing devices located at one location, or execution on a plurality of computing devices that are distributed at a plurality of locations and that are interconnected through a communication network.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A virtual object dynamic change method performed by a terminal or a server based on a cloud platform, the method comprising:

obtaining a target region displayed by a virtual scene of a multiplayer game, wherein the virtual scene is stored in a cloud memory by using cloud storage technology;

determining an environmental element associated with the target region, and an interaction operation on a virtual object displayed in the target region by a player of the multiplayer game, wherein the virtual object is a non-playable character (NPC) AI of the multiplayer game, wherein the terminal sends the operation of the player on the terminal and region data corresponding to the displayed target region to the server, wherein the data is synchronized between the terminal and the server;

determining a plurality of dynamic change parameters of the virtual object according to the environmental element and the player's interaction operation on the virtual object by learning through a machine learning technology, wherein a parameter of the virtual object in the target region is dynamically adjusted, the plurality of dynamic change parameters including an object behavior parameter of the virtual object and a refresh parameter of the virtual object;

updating the target region in the virtual scene according to the environmental element;

causing the virtual object to perform a predefined behavior in the updated target region according to the object behavior parameter of the virtual object; and updating the predefined behavior performed by the virtual object in the virtual scene according to the refresh parameter of the virtual object when a refreshment condition is met, wherein the interaction operation comprises a speed of killing the virtual object, and the refresh parameter is updated when the speed of killing reaches a threshold, wherein the determining the plurality of dynamic change parameters of the virtual object according to the environmental element and the player's interaction operation on the virtual object comprises:

mapping, based on a preset mapping rule, the interaction operation to the refresh parameter of the virtual object, wherein the mapping comprises:

determining the killing speed in each preset period;

changing a dynamic refresh count when the killing speed in any preset period is less than a speed threshold;

determining, according to the preset mapping rule and the dynamic refresh count, the refresh parameter of the virtual object;

resetting the dynamic refresh count when the killing speed in any preset period is greater than or equal to the speed threshold; and refreshing the virtual object in the target region based on a default refresh parameter, and wherein the determining the environmental element associated with the target region and the determining the dynamic change parameter according to the environmental element comprise performing image recognition and analysis on the target region in the virtual scene using image recognition processing technology.

2. The method according to claim 1, wherein the environmental element comprises at least one of: time, weather, and existence of a facility in proximity of the virtual object.

3. The method according to claim 1, wherein the object behavior parameter comprises a behavior and a motion parameter, and the causing the virtual object to perform the predefined behavior comprises:

causing the virtual object to perform the behavior based on the motion parameter.

4. The method according to claim 3, wherein the behavior comprises at least one of: patrolling, sitting, sleeping, hiding, and interacting with the facility, and the motion parameter comprises at least one of moving speed, moving distance, patrolling route, climbing height, and alert range.

5. The method according to claim 1, wherein the refresh parameter comprises at least one of: virtual object type and association with a facility.

6. The method according to claim 1, wherein the virtual object belongs to a virtual object cluster, and the refresh parameter comprises at least one of: group quantity and distribution region.

7. The method according to claim 1, wherein the refreshment condition is at least one of:

the virtual object is killed; and a time period is over.

8. A computer device, comprising:

a memory, configured to store executable instructions; and a processor, configured to execute the executable instructions and cause the computer device to perform a virtual object dynamic change method based on a cloud platform, the method including:

obtaining a target region displayed by a virtual scene of a multiplayer game, wherein the virtual scene is stored in a cloud memory by using cloud storage technology;

determining an environmental element associated with the target region, and an interaction operation on a virtual object displayed in the target region by a player of the multiplayer game, wherein the virtual object is a non-playable character (NPC) AI of the multiplayer game, wherein the computer device sends the operation of the player on the terminal and region data corresponding to the displayed target region to a server, wherein the data is synchronized between the terminal and the server;

determining a plurality of dynamic change parameters of the virtual object according to the environmental element and the player's interaction operation on the virtual object by learning through a machine learning technology, wherein a parameter of the virtual object in the target region is dynamically adjusted, the plurality of dynamic change parameters including an object behavior parameter of the virtual object and a refresh parameter of the virtual object;

updating the target region in the virtual scene according to the environmental element;

causing the virtual object to perform a predefined behavior in the updated target region according to the object behavior parameter of the virtual object; and updating the predefined behavior performed by the virtual object in the virtual scene according to the refresh parameter of the virtual object when a refreshment condition is met, wherein the interaction operation comprises a speed of killing the virtual object, and the refresh parameter is updated when the speed of killing reaches a threshold, wherein the determining the plurality of dynamic change parameters of the virtual object according to the environmental element and the player's interaction operation on the virtual object comprises:

mapping, based on a preset mapping rule, the interaction operation to the refresh parameter of the virtual object;

wherein the mapping comprises:

determining the killing speed in each preset period;

changing a dynamic refresh count when the killing speed in any preset period is less than a speed threshold;

determining, according to the preset mapping rule and the dynamic refresh count, the refresh parameter of the virtual object;

resetting the dynamic refresh count when the killing speed in any preset period is greater than or equal to the speed threshold; and refreshing the virtual object in the target region based on a default refresh parameter, and wherein the determining the environmental element associated with the target region and the determining the dynamic change parameter according to the environmental element comprise performing image recognition and analysis on the target region in the virtual scene using image recognition processing technology.

9. The computer device according to claim 8, wherein the environmental element comprises at least one of: time, weather, and existence of a facility in proximity of the virtual object.

10. A non-transitory computer-readable storage medium, storing executable instructions, the executable instructions, when executed by a processor of a computer device, causing the computer device to perform a virtual object dynamic change method based on a cloud platform, the method including:

obtaining a target region displayed by a virtual scene of a multiplayer game, wherein the virtual scene is stored in a cloud memory by using cloud storage technology;

determining an environmental element associated with the target region, and an interaction operation on a virtual object displayed in the target region by a player of the multiplayer game, wherein the virtual object is a non-playable character (NPC) AI of the multiplayer game, wherein the computer device sends the operation of the player on the terminal and region data corresponding to the displayed target region to a server, wherein the data is synchronized between the terminal and the server;

determining a plurality of dynamic change parameters of the virtual object according to the environmental element and the player's interaction operation on the virtual object by learning through a machine learning technology, wherein a parameter of the virtual object in the target region is dynamically adjusted, the plurality of dynamic change parameters including an object behavior parameter of the virtual object and a refresh parameter of the virtual object;

updating the target region in the virtual scene according to the environmental element;

causing the virtual object to perform a predefined behavior in the updated target region according to the object behavior parameter of the virtual object; and updating the predefined behavior performed by the virtual object in the virtual scene according to the refresh parameter of the virtual object when a refreshment condition is met, wherein the interaction operation comprises a speed of killing the virtual object, and the refresh parameter is updated when the speed of killing reaches a threshold, wherein the determining the plurality of dynamic change parameters of the virtual object according to the environmental element and the player's interaction operation on the virtual object comprises:

mapping, based on a preset mapping rule, the interaction operation to the refresh parameter of the virtual object;

wherein the mapping comprises:

determining the killing speed in each preset period;

changing a dynamic refresh count when the killing speed in any preset period is less than a speed threshold;

determining, according to the preset mapping rule and the dynamic refresh count, the refresh parameter of the virtual object;

resetting the dynamic refresh count when the killing speed in any preset period is greater than or equal to the speed threshold; and refreshing the virtual object in the target region based on a default refresh parameter, and wherein the determining the environmental element associated with the target region and the determining the dynamic change parameter according to the environmental element comprise performing image recognition and analysis on the target region in the virtual scene using image recognition processing technology.

11. The non-transitory computer-readable storage medium according to claim 10, wherein the environmental element comprises at least one of: time, weather, and existence of a facility in proximity of the virtual object.

* * * * *